US010170749B2

(12) United States Patent
Zhamu et al.

(10) Patent No.: US 10,170,749 B2
(45) **Date of Patent: *Jan. 1, 2019**

(54) ALKALI METAL BATTERY HAVING AN INTEGRAL 3D GRAPHENE-CARBON-METAL HYBRID FOAM-BASED ELECTRODE

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Nanotek Instruments, Inc., Dayton, OH (US)

(*) Notice: Subject to any disclaimer, the term of this patent is extended or adjusted under 35 U.S.C. 154(b) by 312 days.

This patent is subject to a terminal disclaimer.

(21) Appl. No.: 15/175,715

(22) Filed: Jun. 7, 2016

(65) Prior Publication Data

US 2017/0352868 A1 Dec. 7, 2017

(51) Int. Cl.

| | |
|---|---|
| ***H01M 4/133*** | (2010.01) |
| ***H01M 4/1393*** | (2010.01) |
| ***H01M 10/0525*** | (2010.01) |
| ***H01M 4/04*** | (2006.01) |
| ***H01M 4/587*** | (2010.01) |
| ***H01M 4/62*** | (2006.01) |
| ***H01M 4/66*** | (2006.01) |
| ***H01M 10/054*** | (2010.01) |
| ***H01M 10/42*** | (2006.01) |
| *H01M 4/02* | (2006.01) |

(52) U.S. Cl.

CPC ........... *H01M 4/133* (2013.01); *H01M 4/043* (2013.01); *H01M 4/045* (2013.01); *H01M 4/0471* (2013.01); *H01M 4/1393* (2013.01); *H01M 4/587* (2013.01); *H01M 4/623* (2013.01); *H01M 4/625* (2013.01); *H01M 4/661* (2013.01); *H01M 10/054* (2013.01); *H01M 10/0525* (2013.01); *H01M 10/4235* (2013.01); *H01M 2004/021* (2013.01); *H01M 2004/027* (2013.01); *H01M 2004/028* (2013.01); *H01M 2220/20* (2013.01)

(58) Field of Classification Search

CPC .... H01M 4/043; H01M 4/045; H01M 4/0471; H01M 4/133; H01M 4/1393; H01M 4/587; H01M 4/623; H01M 4/625; H01M 4/661; H01M 10/0525; H01M 10/054; H01M 10/4235; H01M 2004/021; H01M 2004/027; H01M 2004/028; H01M 2220/20

See application file for complete search history.

(56) References Cited

U.S. PATENT DOCUMENTS

| | | | |
|---|---|---|---|
| 3,002,500 A | 10/1961 | Diesing et al. | |
| 6,872,330 B2 | 3/2005 | Mack et al. | |
| 7,071,258 B1 | 7/2006 | Jang et al. | |
| 9,905,373 B2 * | 2/2018 | Zhamu .................. | H01G 11/32 |
| 2005/0271574 A1 | 12/2005 | Jang | |
| 2008/0048152 A1 | 2/2008 | Jang | |
| 2013/0171502 A1 * | 7/2013 | Chen ...................... | H01G 11/06 429/149 |

OTHER PUBLICATIONS

PCT/US17/35484 International Search Report and Written Opinion dated Aug. 29, 2017, 9 pages.

Bor Z. Jang and A Zhamu, "Processing of Nano Graphene Platelets (NGPs) and NGP Nanocomposites: A Review," J. Materials Sci. 43 (2008) 5092-5101.

William S. Hummers, Jr., et al., Preparation of Graphitic Oxide, Journal of the American Chemical Society, 1958, p. 1339.

Y. Xu, et al. "Self-Assembled Graphene Hydrogel via a One-Step Hydrothermal Process," ACS Nano 2010, 4, 4324-4330.

Zongping Chen, et al., "Three-dimensional flexible and conductive interconnected graphene networks grown by chemical vapour deposition," Nature Materials, 10 (Jun. 2011) 424-428.

B. G. Choi, et al., "3D Macroporous Graphene Frameworks for Supercapacitors with High Energy and Power Densities," ACS Nano, 6 (2012) 4020-4028.

Yang, et al. "Two-dimensional Graphene Nano-ribbons," J. Am. Chem. Soc. 130 (2008) 4216-17.

* cited by examiner

*Primary Examiner* — Anca Eoff

(57) ABSTRACT

Provided is a lithium or sodium metal battery having an anode, a cathode, and a porous separator and/or an electrolyte, wherein the anode contains an integral 3D graphene-carbon hybrid foam composed of multiple pores, pore walls, and a lithium-attracting metal residing in the pores; wherein the metal is selected from Au, Ag, Mg, Zn, Ti, Na, K, Al, Fe, Mn, Co, Ni, Sn, V, Cr, or an alloy thereof and is in an amount of 0.1% to 50% of the total hybrid foam weight or volume, and the pore walls contain single-layer or few-layer graphene sheets chemically bonded by a carbon material having a carbon material-to-graphene weight ratio from 1/200 to 1/2, wherein graphene sheets contain a pristine graphene or non-pristine graphene selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

23 Claims, 14 Drawing Sheets

ALKALI METAL BATTERY HAVING AN INTEGRAL 3D GRAPHENE-CARBON-METAL HYBRID FOAM-BASED ELECTRODE

FIELD OF THE INVENTION

The present invention relates generally to the field of alkali metal battery (e.g. lithium metal battery or sodium metal battery) and, more particularly, to a lithium or sodium metal secondary battery having an integral 3D graphene-carbon-metal hybrid foam-based electrode and a process for producing this electrode and battery.

BACKGROUND OF THE INVENTION

A Critical Review on Alkali Metal Secondary Batteries

Rechargeable lithium-ion (Li-ion) and lithium metal batteries (e.g. Li-sulfur, Li metal-air, and lithium-metal oxide batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal. Hence, in general, Li metal batteries have a significantly higher energy density than lithium ion batteries. Similarly, Na metal batteries have a higher energy than corresponding sodium ion batteries.

Historically, rechargeable lithium metal batteries were produced using non-lithiated compounds, such as $TiS_2$, $MoS_2$, $MnO_2$, $CoO_2$, and $V_2O_5$, as the cathode active materials, coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's.

To overcome these safety issues, several alternative approaches were proposed in which either the electrolyte or the anode was modified. The first approach involves replacing Li metal by graphite (a Li insertion material) as the anode. The operation of such a battery involves shuttling Li ions between two Li insertion compounds at the anode and the cathode, respectively; hence, the name "Li-ion battery." Presumably because of the presence of Li in its ionic rather than metallic state, Li-ion batteries are inherently safer than Li-metal batteries. The second approach entails replacing the liquid electrolyte by a dry polymer electrolyte, leading to the Li solid polymer electrolyte (Li-SPE) batteries. However, Li-SPE has seen very limited applications since it typically requires an operating temperature of up to 80° C. The third approach involves the use of a solid electrolyte that is presumably resistant to dendrite penetration, but the solid electrolyte normally exhibits excessively low lithium-ion conductivity at room temperature. Alternative to this solid electrolyte approach is the use of a rigid solid protective layer between the anode active material layer and the separator layer to stop dendrite penetration, but this typically ceramic material-based layer also has a low ion conductivity and is difficult and expensive to make and to implement in a lithium metal battery. Furthermore, the implementation of such a rigid and brittle layer is incompatible with the current lithium battery manufacturing process and equipment.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of graphite anode is <372 mAh/g and that of lithium transition-metal oxide or phosphate based cathode active material is typically in the range of 140-200 mAh/g. As a result, the specific energy of commercially available Li-ion cells is typically in the range of 120-220 Wh/kg, most typically 150-180 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Among various advanced energy storage devices, alkali metal batteries, including Li-air (or Li—$O_2$), Na-air (or Na—$O_2$), Li—S, and Na—S batteries, are especially attractive due to their high specific energies.

The Li—$O_2$ battery is possibly the highest energy density electrochemical cell that can be configured today. The Li—$O_2$ cell has a theoretic energy density of 5.2 kWh/kg when oxygen mass is accounted for. A well configured Li—$O_2$ battery can achieve an energy density of 3,000 Wh/kg, 15-20 times greater than those of Li-ion batteries. However, current Li—$O_2$ batteries still suffer from poor energy efficiency, poor cycle efficiency, and dendrite formation and penetration issues.

One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li^0$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weights or volumes. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-350 Wh/kg (based on the total cell weight), which is far below what is possible. In summary, despite its great potential, the practical realization of the Li—S battery has been hindered by several obstacles, such as dendrite-induced internal shorting, low active material utilization efficiency, high internal resistance, self-discharge, and rapid capacity fading on cycling. These technical barriers are due to the poor electrical conductivity of elemental sulfur, the high solubility of lithium polysulfides in organic electrolyte (which migrate to the anode side, resulting in the formation of inactivated $Li_2S$ in the anode), and Li dendrite formation and penetration. The most serious problem of Li metal secondary (rechargeable) batteries remains to be the dendrite formation and penetration. Sodium metal batteries have similar dendrite problems.

A Review on Production of Isolated Graphene Sheets or Nano Graphene Platelets (NGPs)

Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material). The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material.

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

Our research group also presented the first review article on various processes for producing NGPs and NGP nanocomposites [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

Approach 1: Chemical Formation and Reduction of Graphene Oxide (GO)

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=\frac{1}{2}d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.

(2) The chemical treatment process requires a long intercalation and oxidation time, typically 5 hours to five days.

(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.

(4) The thermal exfoliation requires a high temperature (typically 800-1,200° C.) and, hence, is a highly energy-intensive process.

(5) Both heat- and solution-induced exfoliation approaches require a very tedious washing and purification step. For instance, typically 2.5 kg of water is used to wash and recover 1 gram of GIC, producing huge quantities of waste water that need to be properly treated.

(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to overcome the limitations or problems outlined above.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications. The present invention was made to overcome the limitations outlined above.

Another process for producing graphene, in a thin film form (typically <2 nm in thickness), is the catalytic chemical vapor deposition process. This catalytic CVD involves catalytic decomposition of hydrocarbon gas (e.g. $C_2H_4$) on Ni or Cu surface to form single-layer or few-layer graphene. With Ni or Cu being the catalyst, carbon atoms obtained via decomposition of hydrocarbon gas molecules at a temperature of 800-1,000° C. are directly deposited onto Cu foil surface or precipitated out to the surface of a Ni foil from a Ni—C solid solution state to form a sheet of single-layer or few-layer graphene (less than 5 layers). The Ni- or Cu-catalyzed CVD process does not lend itself to the deposition of more than 5 graphene planes (typically <2 nm) beyond which the underlying Ni or Cu layer can no longer provide any catalytic effect. The CVD graphene films are extremely expensive.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets. The present invention was made to overcome the limitations outlined above.

Hence, an urgent need exists to have a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets. Furthermore, one should be able to readily make these graphene sheets into a foam structure.

Our recent research has yielded a process for chemical-free production of isolated nano graphene platelets that is novel in that is does not follow the established methods for production of nano graphene platelets outlined above. In addition, the process is of enhanced utility in that it is cost effective, and provided novel graphene materials with significantly reduced environmental impact. Furthermore, as herein disclosed, we have combined the chemical-free production of graphene and the formation of a graphene-carbon hybrid form into one single operation.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the other graphene materials have 0.001%-50% by weight of non-carbon elements (e.g. O, H, N, B, F, Cl, Br, I, S, etc.). These materials are herein referred to as non-pristine graphene materials. The presently invented graphene-carbon foam can contain pristine or non-pristine graphene and the invented method allows for this flexibility.

A Review on Production of Graphene Foams

Generally speaking, a foam or foamed material is composed of pores (or cells) and pore walls (a solid material). The pores can be interconnected to form an open-cell foam. A graphene foam is composed of pores and pore walls that contain a graphene material. There are three major methods of producing graphene foams:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range of 180-300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330. There are several major issues associated with this method: (a) The high pressure requirement makes it an impractical method for industrial-scale production. For one thing, this process cannot be conducted on a continuous basis. (b) It is difficult, if not impossible, to exercise control over the pore size and the porosity level of the resulting porous structure. (c) There is no flexibility in terms of varying the shape and size of the resulting reduced graphene oxide (RGO) material (e.g. it cannot be made into a film shape). (d) The method involves the use of an ultra-low concentration of GO suspended in water (e.g. 2 mg/mL=2 g/L=2 kg/kL). With the removal of non-carbon elements (up to 50%), one can only produce less than 2 kg of graphene material (RGO) per 1000-liter suspension. Furthermore, it is practically impossible to operate a 1000-liter reactor that has to withstand the conditions of a high temperature and a high pressure. Clearly, this is not a scalable process for mass production of porous graphene structures.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open-cell foam. A useful reference for this method is given here: Zongping Chen, et al., "Three-dimensional flexible and conductive interconnected graphene networks grown by chemical vapour deposition," Nature Materials, 10 (June 2011) 424-428. There are several problems associated with such a process: (a) the catalytic CVD is intrinsically a very slow, highly energy-intensive, and expensive process; (b) the etching agent is typically a highly undesirable chemical and the resulting Ni-containing etching solution is a source of pollution. It is very difficult and expensive to recover or recycle the dissolved Ni metal from the etchant solution. (c) It is challenging to maintain the shape and dimensions of the graphene foam without damaging the cell walls when the Ni foam is being etched away. The resulting graphene foam is typically very brittle and fragile. (d) The transport of the CVD precursor gas (e.g. hydrocarbon) into the interior of a metal foam can be difficult, resulting in a non-uniform structure, since certain spots inside the sacrificial metal foam may not be accessible to the CVD precursor gas.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores. [B. G. Choi, et al., "3D Macroporous Graphene Frameworks for Supercapacitors with High Energy and Power Densities," ACS Nano, 6 (2012) 4020-4028.] Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process. This method also has several shortcomings: (a) This method requires very tedious chemical treatments of both graphene oxide and PS particles. (b) The removal of PS by toluene also leads to weakened macro-porous structures. (c) Toluene is a highly regulated chemical and must be treated with extreme caution. (d) The pore sizes are typically excessively big (e.g. several μm), too big for many useful applications.

The above discussion clearly indicates that every prior art method or process for producing graphene foams has major deficiencies. Thus, it is an object of the present invention to provide a cost-effective process for producing highly conductive, mechanically robust graphene-based foams (specifically, integral 3D graphene-carbon hybrid foam) in large quantities. This process does not involve the use of an environmentally unfriendly chemical. This process enables the flexible design and control of the porosity level and pore sizes in such a manner that a lithium-attracting metal or sodium-attracting metal is readily and easily accommodated in these pores to promote and facilitate fast entry and uniform deposition of lithium ions or sodium ions if the resulting graphene-metal foam is used as an anode layer of a lithium metal or sodium metal battery.

It is another object of the present invention to provide a process for producing graphene-carbon hybrid foams that exhibit a thermal conductivity, electrical conductivity, elastic modulus, and/or strength that are comparable to or greater than those of the conventional graphite or carbon foams. Such a hybrid foam, if containing a select alkali metal-attracting metal, is conducive to being used as a supporting substrate for lithium in the anode of a lithium metal secondary battery to suppress the formation of lithium or sodium dendrites.

Yet another object of the present invention is to provide (a) a pristine graphene-based hybrid foam that contains essentially all carbon only and preferably have a meso-scaled pore size range (2-50 nm); and (b) non-pristine graphene foams (graphene fluoride, graphene chloride, nitrogenated graphene, etc.) that contains at least 0.001% by weight (typically from 0.01% to 25% by weight and most typically from 0.1% to 20%) of non-carbon elements that can be used for lithium metal battery applications.

A specific object of the present invention is to provide graphene-carbon-metal hybrid foam-based electrodes for lithium metal and sodium metal secondary batteries that exhibit long and stable charge-discharge cycle life without exhibiting lithium or sodium dendrite problems.

SUMMARY OF THE INVENTION

The present invention provides an integral 3D graphene-carbon-metal hybrid foam-based electrode for an alkali metal battery (lithium or sodium metal battery) and a process for producing such an electrode directly from particles of a graphitic material and particles of a polymer. This process is stunningly simple, fast, cost-effective, and environmentally benign. The invention also provides a lithium metal battery containing such a unique electrode as an anode.

In a preferred embodiment, the lithium or sodium metal battery has an anode, a cathode, a porous separator electronically separating the anode and the cathode, and/or an electrolyte in ionic contact with the anode and the cathode, wherein the anode contains an integral 3D graphene-carbon-metal hybrid foam composed of multiple pores, pore walls, and a lithium-attracting metal or sodium-attracting metal residing in the pores (e.g. as nano particles lodged in the pores or as a coating deposited on pore wall surfaces). The lithium-attracting metal (for a lithium metal battery) is selected from Au, Ag, Mg, Zn, Ti, Na, K, Al, Fe, Mn, Co, Ni, Sn, V, Cr, or an alloy thereof and is in an amount of 0.1% to 50% of the total hybrid foam weight or volume. The sodium-attracting metal (for a sodium metal battery) is selected from Au, Ag, Mg, Zn, Ti, Li, K, Al, Fe, Mn, Co, Ni, Sn, V, Cr, or an alloy thereof and is in an amount of 0.1% to 50% of the total hybrid foam weight or volume. The pore walls contain single-layer or few-layer graphene sheets chemically bonded by a carbon material having a carbon material-to-graphene weight ratio from 1/200 to 1/2, wherein the few-layer graphene sheets have 2-10 layers of stacked graphene planes having an inter-plane spacing $d_{002}$ from 0.3354 nm to 0.40 nm as measured by X-ray diffraction and the single-layer or few-layer graphene sheets contain a pristine graphene material having essentially zero % of non-carbon elements, or a non-pristine graphene material having 0.001% to 25% by weight of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In one preferred embodiment, the integral 3D graphene-carbon-metal hybrid foam is pre-loaded with lithium or sodium before the battery is made, or the anode further contains a lithium source or a sodium source. The lithium source is preferably selected from foil, particles, or filaments of lithium metal or lithium alloy having no less than 80% by weight of lithium element in the lithium alloy. The sodium source is preferably selected from foil, particles, or filaments of sodium metal or sodium alloy having no less than 80% by weight of sodium element in the sodium alloy.

In the aforementioned lithium or sodium metal battery, each cell contains an anode layer wherein the integral graphene-carbon structure itself is an anode current collector that supports lithium when the battery is charged. Thus, the anode layer is a single-layer structure containing no additional, separate current collector (such as the commonly used Cu foil). In some alternative embodiments, the lithium metal battery further comprises a separate, discrete anode current collector in contact with the anode. Typically, there is a separate, discrete cathode current collector (e.g. Al foil) in contact with the cathode active material layer (containing cathode active material, such as $MoS_2$, $TiO_2$, $V_2O_5$, $LiV_3O_8$, S, Se, etc.), which is supported by (coated on) the Al foil.

The few-layer graphene sheets have 2-10 layers of stacked graphene planes having an inter-plane spacing $d_{002}$ from 0.3354 nm to 0.40 nm as measured by X-ray diffraction and the single-layer or few-layer graphene sheets contain a pristine graphene material having essentially zero % of non-carbon elements, or a non-pristine graphene material having an adjustable 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In this battery, the 3D graphene-carbon foam, when measured without the presence of the lithium-attracting metal, typically has a density from 0.005 to 1.7 g/cm$^3$ (preferably from 0.1 to 1.7 g/cm$^3$), a specific surface area from 50 to 3,200 m$^2$/g (more typically from 300 to 3,200 m$^2$/g), a thermal conductivity of at least 200 W/mK per unit of specific gravity, and/or an electrical conductivity no less than 2,000 S/cm per unit of specific gravity. Preferably, the average pore size in the hybrid foam is from 2 nm to 50 nm, and the specific surface area is from 500 m$^2$/g to 3,200 m$^2$/g.

In some embodiments, the pore walls contain a non-pristine graphene material and the hybrid foam contains a content of non-carbon elements in the range of 0.01% to 20% by weight and the non-carbon elements include an element selected from oxygen, fluorine, chlorine, bromine, iodine, nitrogen, hydrogen, or boron.

In some very unique embodiments, the lithium or sodium metal battery is in a continuous-length filament, wire, or sheet form having a thickness or diameter from 200 nm to 10 cm.

In the battery anode, the pore walls typically contain a 3D network of interconnected graphene planes. In some embodiments, the foam (without metal or prior to metal loading) has a physical density higher than 0.8 g/cm$^3$ and a specific surface area greater than 800 m$^2$/g. In certain embodiments, the graphene-carbon hybrid foam has a physical density higher than 1.0 g/cm$^3$ and a specific surface area greater than 500 m$^2$/g. In certain embodiments, the integral 3D graphene-carbon hybrid foam is chemically or physically activated to further increase the specific surface area.

Typically, the graphene-carbon-metal hybrid foam constitutes an electrode active material loading greater than 10 mg/cm$^2$, and/or the hybrid foam constitutes an electrode layer having a thickness no less than 200 μm, and/or the anode active material and the cathode active material combined exceeds 30% by weight of the total supercapacitor cell weight. Preferably, the hybrid foam constitutes an electrode active material loading greater than 15 mg/cm$^2$, and/or the hybrid foam constitutes an electrode layer having a thickness no less than 300 μm, and/or the anode active material and the cathode active material combined exceeds 40% by weight of the supercapacitor cell. Further preferably, the hybrid foam constitutes an electrode active material loading greater than 20 mg/cm$^2$ and/or wherein the hybrid foam constitutes an electrode layer having a thickness no less than 400 μm, and/or the anode active material and the cathode active material combined exceeds 50% by weight of the battery cell. Most preferably, the hybrid foam constitutes an electrode active material loading greater than 30 mg/cm$^2$ and/or the hybrid foam constitutes an electrode layer having a thickness no less than 500 μm, and/or the anode active material and the cathode active material combined exceeds 60% by weight of the battery cell.

Also provided is a lithium metal battery electrode that comprises an integral 3D graphene-carbon hybrid foam and the lithium- or sodium-attracting metal contained therein. The present invention also provides a process for producing an electrode containing such an integral 3D graphene-carbon-metal foam as an interconnected network of electrode active material. The process comprises:

(a) mixing multiple particles of a graphitic material and multiple particles of a solid polymer carrier material to form a mixture in an impacting chamber of an energy impacting apparatus;
(b) operating this energy impacting apparatus with a frequency and an intensity for a length of time sufficient for peeling off graphene sheets from the graphitic material and transferring the graphene sheets to surfaces of the solid polymer carrier material particles to produce graphene-coated or graphene-embedded polymer particles inside the impacting chamber; (e.g. The impacting apparatus, when in operation, imparts kinetic energy to polymer particles, which in turn impinge upon graphite particle surfaces/edges and peel off graphene sheets from the impacted graphite particles.

These peeled-off graphene sheets stick to surfaces of these polymer particles. This is herein referred to as the "direct transfer" process, meaning that graphene sheets are directly transferred from graphite particles to surfaces of polymer particles without being mediated by any third-party entity.)

(c) recovering the graphene-coated or graphene-embraced polymer particles from the impacting chamber;

(d) mixing the graphene-coated or graphene-embraced polymer particles with the lithium-attracting metal, or a precursor to this metal, to form a mixture;

(e) consolidating said mixture into a sheet, film, rod, or filament structure (or other desired shape); and (f) pyrolyzing the structure to thermally convert the polymer into pores and carbon or graphite that bonds the graphene sheets to form a sheet, film, rod, or filament of the integral 3D graphene-carbon-carbon hybrid foam. This foam structure is basically composed of graphene sheets bonded at their ends/edges by a carbon phase and the lithium-attracting metal residing in the pores.

In certain alternative embodiments, a plurality of impacting balls or media are added to the impacting chamber of the energy impacting apparatus. These impacting balls, accelerated by the impacting apparatus, impact the surfaces/edges of graphite particles and peel off graphene sheets therefrom. These graphene sheets are tentatively transferred to surfaces of these impacting balls. These graphene-supporting impacting balls subsequently impinge upon polymer particles and transfer the supported graphene sheets to the surfaces of these polymer particles. This sequence of events is herein referred to as the "indirect transfer" process. In some embodiments of the indirect transfer process, step (c) includes operating a magnet to separate the impacting balls or media from the graphene-coated or graphene-embraced polymer particles.

The solid polymer material particles can include plastic or rubber beads, pellets, spheres, wires, fibers, filaments, discs, ribbons, or rods, having a diameter or thickness from 10 nm to 1 mm, or larger. Preferably, the diameter or thickness is from 50 nm to 100 μm, and more preferably from 100 nm to 10 μm. The solid polymer may be selected from solid particles of a thermoplastic, thermoset resin, rubber, semi-penetrating network polymer, penetrating network polymer, natural polymer, or a combination thereof. In an embodiment, the solid polymer is partially removed by melting, etching, or dissolving in a solvent prior to step (d).

In certain embodiments, the graphitic material is selected from natural graphite, synthetic graphite, highly oriented pyrolytic graphite, graphite fiber, graphitic nano-fiber, graphite fluoride, oxidized graphite, chemically modified graphite, exfoliated graphite, recompressed exfoliated graphite, expanded graphite, meso-carbon micro-bead, or a combination thereof. Preferably, the graphitic material contains a non-intercalated and non-oxidized graphitic material that has never been previously exposed to a chemical or oxidation treatment prior to the mixing step (a).

We have surprisingly observed that a broad array of impacting devices can be used for practicing the instant invention. For instance, the energy impacting apparatus can be a vibratory ball mill, planetary ball mill, high energy mill, basket mill, agitator ball mill, cryo ball mill, micro ball mill, tumbler ball mill, continuous ball mill, stirred ball mill, pressurized ball mill, freezer mill, vibratory sieve, bead mill, nano bead mill, ultrasonic homogenizer mill, centrifugal planetary mixer, vacuum ball mill, or resonant acoustic mixer.

For the formation of the carbon component of the resulting graphene-carbon hybrid foam, one can choose polymer particles that have a high carbon yield or char yield (e.g. >30% by weight). The carbon yield is the weight percentage of a polymer structure that is converted by heat to a solid carbon phase, instead of becoming part of a volatile gas. The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof.

If a lower carbon content (higher graphene proportion) is desired in the graphene-carbon hybrid foam, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidiene fluoride (PVDF), polytetrafluoroethylene (PTFE), polyphenylene oxide (PPO), poly methyl methacrylate (PMMA), a copolymer thereof, a polymer blend thereof, or a combination thereof.

It may be noted that these polymers (both high and low carbon yields), when heated at a temperature of 300-2,500° C., are converted into a carbon material, which is preferentially nucleated near graphene sheet edges. Such a carbon material serves to bridge the gaps between graphene sheets, forming interconnected electron-conducting pathways. In other words, the resulting graphene-carbon hybrid foam is composed of an integral 3D network of carbon-bonded graphene sheets, allowing continuous transport of electrons and phonons (quantized lattice vibrations) between graphene sheets or domains without interruptions. When further heated at a temperature higher than 2,500° C., the graphene-bonding carbon phase can get graphitized provided that the carbon phase is "soft carbon" or graphitizable. In such a situation, both the electric conductivity and thermal conductivity are further increased.

Thus, in certain embodiments, the step of pyrolyzing includes carbonizing the polymer at a temperature from 200° C. to 2,500° C. to obtain carbon-bonded graphene sheets. Optionally, the carbon-bonded graphene sheets can be subsequently graphitized at a temperature from 2,500° C. to 3,200° C. to obtain graphite-bonded graphene sheets.

It may be noted that pyrolyzation of a polymer tends to lead to the formation of pores in the resulting polymeric carbon phase due to the evolution of those volatile gas molecules such as $CO_2$ and $H_2O$. However, such pores also have a high tendency to get collapsed if the polymer is not constrained when being carbonized. We have surprisingly discovered that the graphene sheets wrapped around a polymer particle are capable of constraining the carbon pore walls from being shrunk and collapsed, while some carbon species also permeate to the gaps between graphene sheets where these species bond the graphene sheets together. The pore sizes and pore volume (porosity level) of the resulting 3D integral graphene foam depend upon the starting polymer size and the carbon yield of the polymer and, to a lesser extent, on the pyrolyzation temperature.

In certain preferred embodiments, the consolidating step includes compacting a mass of these graphene-coated polymer particles into a desired shape. For instance, by squeezing and compressing the mass of graphene-coated particles into a mold cavity one can readily form a compact green body. One can rapidly heat and melt the polymer, slightly compress the green body to slightly fuse the polymer particles together by heat, and rapidly cool to solidify the body. This consolidated body is then subjected to a pyrolysis treatment (polymer carbonization and, optionally, graphitization).

In some alternative embodiments, the consolidating step includes melting the polymer particles to form a polymer melt mixture with graphene sheets dispersed therein, forming the polymer melt mixture into a desired shape and solidifying the shape into a graphene-polymer composite structure. Such shape can be a rod, film (thin or thick film, wide or narrow, single sheets or in a roll), fiber (short filament or continuous long filament), plate, ingot, any regular shape or odd shape. This graphene-polymer composite shape is then pyrolyzed Alternatively, the consolidating step may include dissolving the polymer particles in a solvent to form a polymer solution mixture with graphene sheets dispersed therein, forming the polymer solution mixture into a desired shape, and removing the solvent to solidify the shape into the graphene-polymer composite structure. This composite structure is then pyrolyzed to form a porous structure.

The consolidating step may include melting the polymer particles to form a polymer melt mixture with graphene sheets dispersed therein and extruding the mixture into a rod form or sheet form, spinning the mixture into a fiber form, spraying the mixture into a powder form, or casting the mixture into an ingot form.

In some embodiments, the consolidating step includes dissolving the polymer particles in a solvent to form a polymer solution mixture with graphene sheets dispersed therein and extruding the solution mixture into a rod form or sheet form, spinning the solution mixture into a fiber form, spraying the solution mixture into a powder form, or casting the solution mixture into an ingot form, and removing the solvent.

In a specific embodiment, the polymer solution mixture is sprayed to create a graphene-polymer composite coating or film, which is then pyrolyzed (carbonized or carbonized and graphitized).

Preferably, the consolidating step may include compacting the graphene-coated polymer particles in a porous green compact having macroscopic pores and then infiltrate or impregnate the pores with an additional carbon source material selected from a petroleum pitch, coal tar pitch, an aromatic organic material (e.g. naphthalene or other derivatives of a pitch), a monomer, an organic polymer, or a combination thereof. The organic polymer may contain a high carbon-yield polymer selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof. When the infiltrated green compact of graphene-coated polymer particles is subjected to pyrolyzation, these species become additional sources of carbon, if a higher amount of carbon in the hybrid foam is desired.

It may be noted that there are no limitations on the shape or dimensions of the presently invented graphene-carbon hybrid foam. In a preferred embodiment, the integral graphene-carbon hybrid foam is made into a continuous-length roll sheet form (a roll of a continuous foam sheet) having a thickness no less than 100 nm and no greater than 10 cm and a length of at least 1 meter long, preferably at least 2 meters, further preferably at least 10 meters, and most preferably at least 100 meters. This sheet roll is produced by a roll-to-roll process. There has been no prior art graphene-based foam that is made into a sheet roll form. It has not been previously found or suggested possible to have a roll-to-roll process for producing a continuous length of graphene foam, either pristine or non-pristine based.

For battery electrode applications, the graphene-carbon foam preferably has an oxygen content or non-carbon content less than 2% by weight, more preferably less than 1% by weight, even more preferably less than 0.5% by weight and the pore walls have stacked graphene planes having an inter-graphene spacing less than 0.35 nm, a thermal conductivity of at least 250 W/mK per unit of specific gravity, and/or an electrical conductivity no less than 2,500 S/cm per unit of specific gravity.

In a further preferred embodiment, the graphene-carbon hybrid foam has an oxygen content or non-carbon content less than 0.01% by weight and said pore walls contain stacked graphene planes having an inter-graphene spacing less than 0.34 nm, a thermal conductivity of at least 300 W/mK per unit of specific gravity, and/or an electrical conductivity no less than 3,000 S/cm per unit of specific gravity.

In yet another preferred embodiment, the graphene-carbon hybrid foam has an oxygen content or non-carbon content no greater than 0.01% by weight and said pore walls contain stacked graphene planes having an inter-graphene spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

In still another preferred embodiment, the graphene foam has pore walls containing stacked graphene planes having an inter-graphene spacing less than 0.336 nm, a mosaic spread value no greater than 0.4, a thermal conductivity greater than 400 W/mK per unit of specific gravity, and/or an electrical conductivity greater than 4,000 S/cm per unit of specific gravity.

In a preferred embodiment, the pore walls contain stacked graphene planes having an inter-graphene spacing less than 0.337 nm and a mosaic spread value less than 1.0. In a preferred embodiment, the graphene foam exhibits a degree of graphitization no less than 80% (preferably no less than 90%) and/or a mosaic spread value less than 0.4. In a preferred embodiment, the pore walls contain a 3D network of interconnected graphene planes.

In a preferred embodiment, the solid graphene-carbon hybrid foam contains meso-scaled pores having a pore size from 2 nm to 50 nm. The solid graphene foam can also be made to contain micron-scaled pores (1-500 μm) or meso-scaled pores 500 nm to 1 μm.

In certain embodiments, the step (d) of consolidating the graphene-coated or graphene-embedded polymer particles is conducted in a roll-to-roll manner to form a roll of graphene-polymer composite structure sheet or film, which is pyrolyzed to form a sheet or film of the integral 3D graphene-carbon hybrid foam. Preferably, the step (e) of pyrolyzation is followed by a step of chemically or physically activating the integral 3D graphene-carbon hybrid foam.

Also provided is a process for producing a continuous sheet of a lithium metal electrode. The process comprises the steps of laminating an anode layer, a separator/electrolyte layer, and a cathode layer, wherein the anode layer contains a continuous sheet or film of the integral 3D graphene-carbon hybrid foam produced by the presently invented process. The continuous sheet or film of the hybrid foam is pre-loaded with a liquid or gel electrolyte prior to being laminated to form a lithium metal battery sheet. Such a sheet-like battery can be rolled up, twisted, or folded back and forth to make many unique shapes.

DESCRIPTION OF THE PREFERRED EMBODIMENTS

Figure 1:
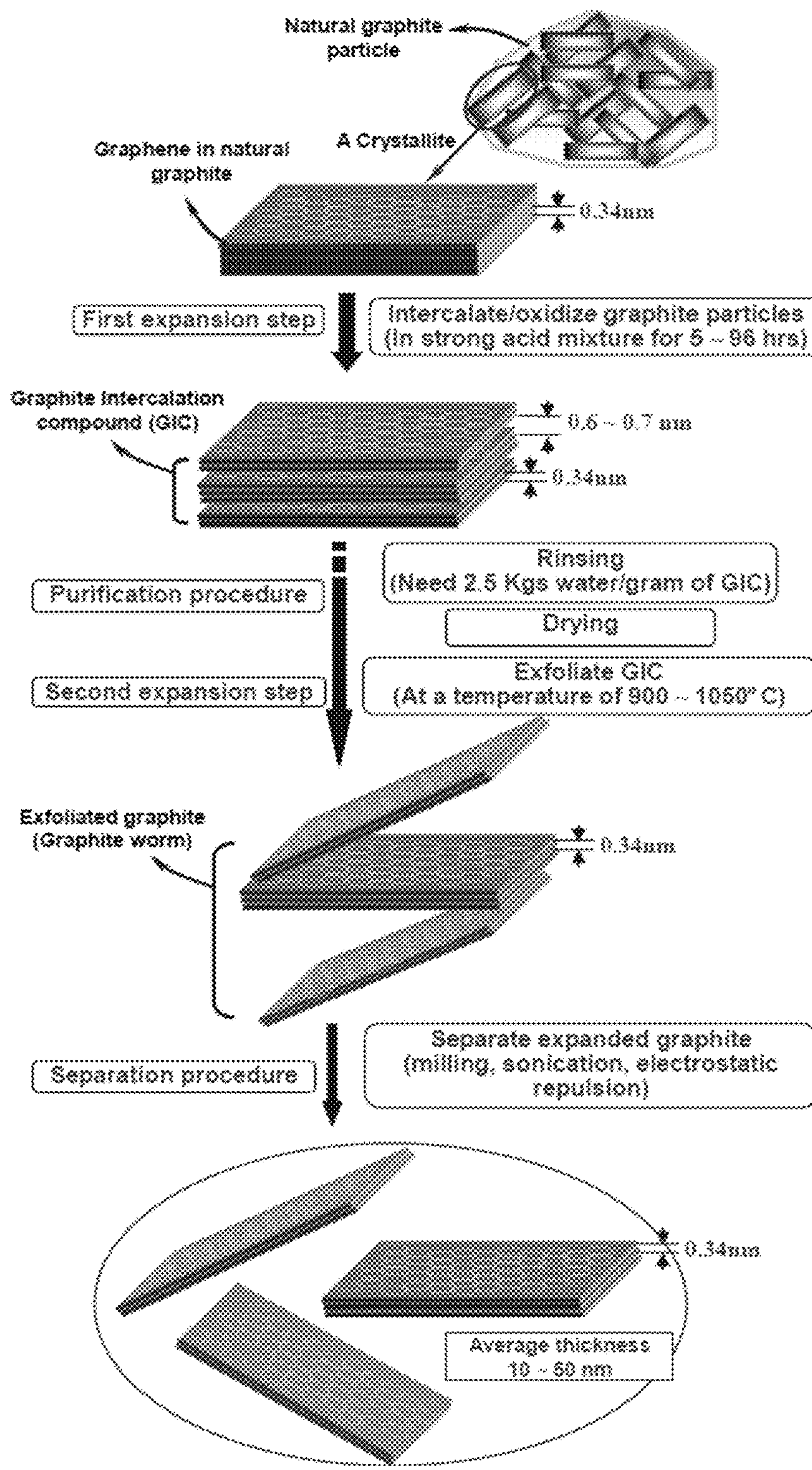
FIG. 1 A flow chart showing the most commonly used prior art process of producing highly oxidized NGPs that entails tedious chemical oxidation/intercalation, rinsing, and high-temperature exfoliation procedures.
Figure 2A:
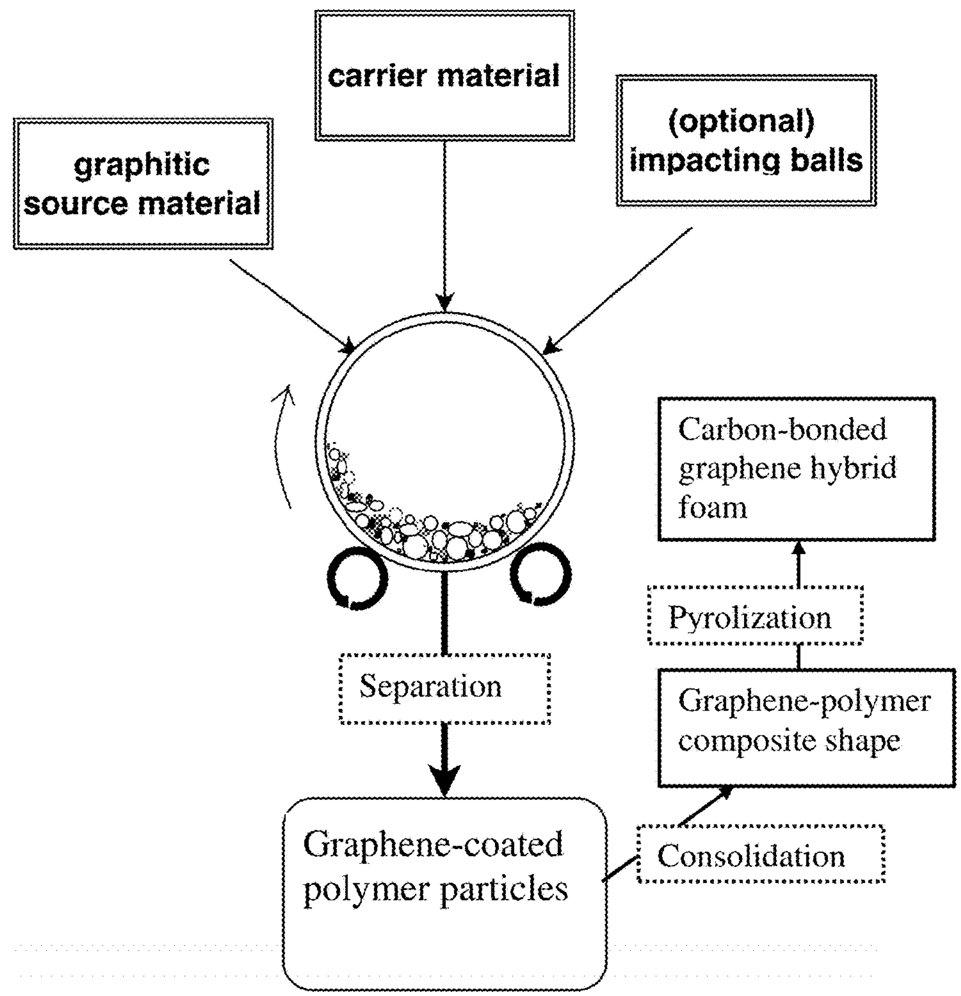
FIG. 2(A) A flow chart showing the presently invented process for producing integral 3D graphene-carbon hybrid foam.
Figure 2B:
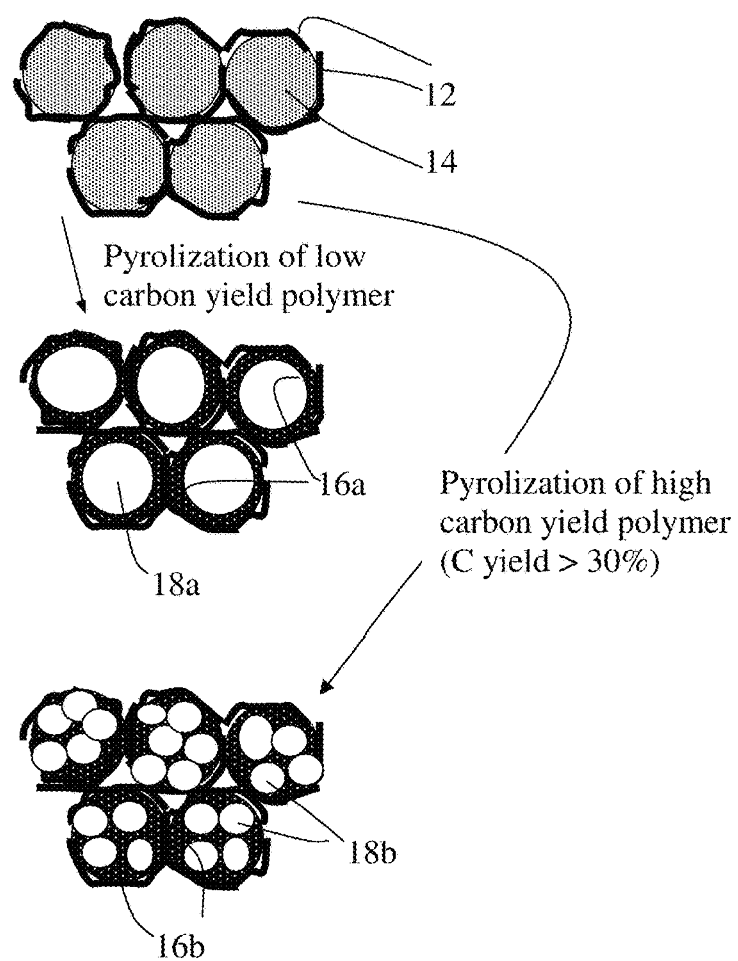
FIG. 2(B) Schematic of the heat-induced conversion of polymer into carbon, which bonds graphene sheets together to form a 3D graphene-carbon hybrid foam. The compacted structure of graphene-coated polymer particles is converted into a highly porous structure.
Figure 2C:
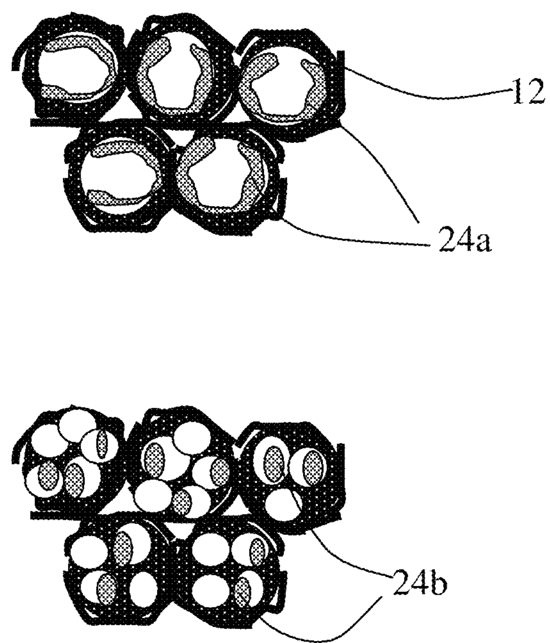
FIG. 2(C) The 3D graphene-carbon hybrid foam containing a lithium- or sodium-attracting metal residing in the pores (e.g. coated on pore walls) of the foam.
Figure 2D:
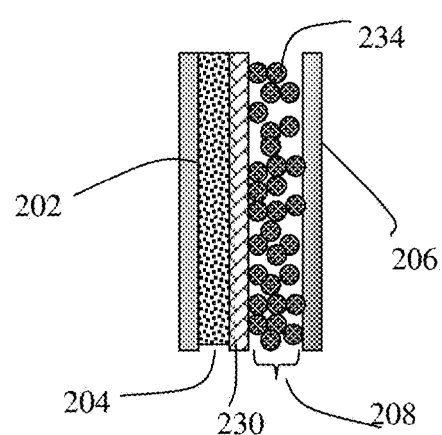
FIG. 2(D) Schematic of a prior art lithium metal battery cell.

As schematically illustrated in FIG. 2(D), a prior art lithium metal cell is typically composed of an anode current collector 202 (e.g. Cu foil 8-12 μm thick), an anode active material layer 204 (a foil of lithium metal or lithium-rich metal alloy), a porous separator 230, a cathode active material layer 208 (containing a cathode active material, such as $V_2O_5$ and $MoS_2$ particles 234, and conductive additives that are all bonded by a resin binder, not shown), a cathode current collector 206 (e.g. Al foil), and an electrolyte disposed in ionic contact with both the anode active material layer 204 (also simply referred to as the "anode layer") and the cathode active material layer 208 (or simply "cathode layer"). The entire cell is encased in a protective housing, such as a thin plastic-aluminum foil laminate-based envelop. A prior art sodium metal cell is similarly configured, but the anode active material layer is a foil of sodium metal or sodium-rich metal, or particles of sodium.

The prior art lithium or sodium metal cell is typically made by a process that includes the following steps: (a) The first step is mixing and dispersing particles of the cathode active material (e.g. activated carbon), a conductive filler (e.g. acetylene black), a resin binder (e.g. PVDF) in a solvent (e.g. NMP) to form a cathode slurry; (b) The second step includes coating the cathode slurry on the surface(s) of an Al foil and drying the slurry to form a dried cathode electrode coated on the Al foil; (c) The third step includes laminating a Cu foil (as an anode current collector), a sheet of Li or Na foil (or lithium alloy or sodium alloy foil), a porous separator layer, and a cathode electrode-coated Al foil sheet together to form a 5-layer assembly, which is cut and slit into desired sizes and stacked to form a rectangular structure (as an example of shape) or rolled into a cylindrical cell structure; (d) The rectangular or cylindrical laminated structure is then encased in an aluminum-plastic laminated envelope or steel casing; and (e) A liquid electrolyte is then injected into the laminated structure to make a lithium battery cell.

Due to the high specific capacity of lithium metal and sodium metal, the highest battery energy density can be achieved by alkali metal rechargeable batteries that utilize a lithium metal or sodium metal as the anode active material, provided that a solution to the safety problem can be formulated. These cells include (a) the traditional Li or Na metal battery having a Li insertion or Na insertion compound in the cathode, (b) the Li-air or Na—$O_2$ cell that uses oxygen as a cathode instead of metal oxide (and Li or sodium metal as an anode instead of graphite or hard carbon), (c) the Li-sulfur or Na—S cell, (d) the lithium-selenium cell or sodium-selenium cell, and (e) the Li-graphene or Na-graphene cell using graphene as the main cathode active material.

The Li—$O_2$ battery is possibly the highest energy density electrochemical cell that can be configured today. The Li—$O_2$ cell has a theoretic energy density of 5,200 Wh/kg when oxygen mass is accounted for. A well configured Li—$O_2$ battery can achieve an energy density of 3,000 Wh/kg, which is 15-20 times greater than those of Li-ion batteries. However, current Li—$O_2$ batteries still suffer from poor energy efficiency, poor cycle efficiency, and dendrite formation issues. In the Li—S cell, elemental sulfur (S) as a cathode material exhibits a high theoretical Li storage capacity of 1,672 mAh/g. With a Li metal anode, the Li—S battery has a theoretical energy density of ~1,600 Wh/kg. Despite its great potential, the practical realization of the Li—S battery has been hindered by several obstacles, such as low utilization of active material, high internal resistance, self-discharge, and rapid capacity fading on cycling. These technical barriers are due to the poor electrical conductivity of elemental sulfur, the high solubility of lithium polysulfides in organic electrolyte, the formation of inactivated $Li_2S$, and the formation of Li dendrites on the anode. Despite great efforts worldwide, dendrite formation remains the single most critical scientific and technological barrier against widespread implementation of all kinds of high energy density batteries having a Li metal anode.

We have discovered a highly dendrite-resistant, graphene/carbon/metal foam-enabled Li metal cell or Na metal cell configuration that exhibits a high energy and/or high power density. Each cell contains an integral graphene-carbon-metal foam as an anode active material, wherein a lithium- or sodium-attracting metal, 24*a* or 24*b* in FIG. 2(C), is deposited on the pore walls or lodged inside the pores of this integral foam structure. This integral 3D graphene-carbon foam is composed of graphene sheets (e.g. 12 in FIG. 2(B)) that are bonded by a carbon binder (e.g. 16*a* and 16*b*), having pores (e.g. 18*a* and 18*b* in FIG. 2(B)) to accommodate the lithium- or sodium-attracting metal. This carbon binder is derived from a carbon precursor (e.g. polymer particle 14). This polymer particle, if having a low carbon yield (e.g. polyethylene particle), can be pyrolyzed to produce macroscopic pores (e.g. 18*a*). A high carbon yield polymer (e.g. polyimide) can be pyrolyzed to produce mesoscopic pores (e.g. 18*b*) having a pore size range of 2-50 nm.

This integral graphene-carbon-metal foam can be lithiated (loaded with Li) or sodiated (loaded with Na) before or after the cell is made. For instance, when the cell is made, a foil or particles of lithium or sodium metal (or metal alloy) may be implemented at the anode (e.g. between the integral foam layer and the porous separator) to supply this foam with lithium or sodium. During the first battery discharge cycle, lithium (or sodium) is ionized, supplying lithium (or sodium) ions ($Li^+$ or $Na^+$) into electrolyte. These $Li^+$ or $Na^+$ ions migrate to the cathode side and get captured by and stored in the cathode active material (e.g. vanadium oxide, $MoS_2$, S, etc.).

During the subsequent re-charge cycle of the battery, $Li^+$ or $Na^+$ ions are released by the cathode active material and migrate back to the anode. These $Li^+$ or $Na^+$ ions naturally diffuse through the pore walls to reach the lithium- or sodium-attracting metal lodged inside the pores or on the inner pore walls of the foam. In this manner, the foam is said to be lithiated or sodiated. Alternatively, the integral foam can be lithiated or sodiated (herein referred to as "pre-lithiated" or "pre-sodiated") electrochemically prior to being incorporated as an anode layer into the cell structure. This can be accomplished by bringing an integral graphene-carbon-metal foam layer in contact with a lithium or sodium foil in the presence of a liquid electrolyte, or by implementing an integral graphene-carbon-metal foam layer as a working electrode and a lithium/sodium foil or rod as a counter-electrode in an electrochemical reactor chamber containing a liquid electrolyte. By introducing an electric current between the working electrode and the counter-electrode, one can introduce lithium or sodium into the foam, wherein $Li^+$ or $Na^+$ ions diffuse into the pores of the foam to form a lithium or sodium alloy with the lithium- or sodium-attracting metal pre-lodged therein.

Graphene is a single-atom thick layer of $sp^2$ carbon atoms arranged in a honeycomb-like lattice. Graphene can be readily prepared from graphite, activated carbon, graphite fibers, carbon black, and meso-phase carbon beads. Single-layer graphene and its slightly oxidized version (GO) can have a specific surface area (SSA) as high as 2670 $m^2/g$. It is this high surface area that dramatically reduces the effective electrode current density, which in turn significantly reduces or eliminates the possibility of Li dendrite formation. However, we have unexpectedly observed that it is difficult for the returning lithium ions or sodium ions (those that return from the cathode back to the anode during battery charge) to uniformly deposit to graphene sheets and well-adhere to these graphene sheets in a porous graphene structure (e.g. a graphene foam) alone without the presence of a lithium- or sodium-attracting metal. Lithium or sodium has a high tendency to not adhere well to graphene surfaces or to get detached therefrom, thereby becoming isolated lithium or sodium clusters that no longer participate in reversible lithium/sodium storage. We have further surprisingly observed that such a lithium- or sodium-attracting metal, if present on the graphene surface or residing in pores of a graphene foam, provides a safe and reliable site to receive and accommodate lithium/sodium during the battery charging step. The resulting lithium alloy or sodium alloy is also capable of reversibly releasing lithium or sodium ions into electrolyte that travel to the cathode side during the subsequent battery discharging step.

The present invention provides a method of producing an integral 3D graphene-carbon hybrid foam-based electrode directly from particles of a graphitic material and particles of a polymer. As schematically illustrated in FIG. 2(A), the method begins with mixing multiple particles of a graphitic material and multiple particles of a solid polymer carrier material to form a mixture, which is enclosed in an impacting chamber of an energy impacting apparatus (e.g. a vibratory ball mill, planetary ball mill, high energy mill, basket mill, agitator ball mill, cryo ball mill, micro ball mill, tumbler ball mill, continuous ball mill, stirred ball mill, pressurized ball mill, freezer mill, vibratory sieve, bead mill, nano bead mill, ultrasonic homogenizer mill, centrifugal planetary mixer, vacuum ball mill, or resonant acoustic mixer). When in operation, this energy impacting device imparts kinetic energy to the solid particles contained therein, allowing polymer particles to impinge upon graphite particles with high intensity and high frequency.

In typical operational conditions, such impacting events result in peeling off of graphene sheets from the graphitic material and transferring the graphene sheets to surfaces of the solid polymer carrier particles. These graphene sheets wrap around polymer particles to form graphene-coated or graphene-embedded polymer particles inside the impacting chamber. This is herein referred to as the "direct transfer" process, meaning that graphene sheets are directly transferred from graphite particles to surfaces of polymer particles without being mediated by any third-party entities.

Alternatively, a plurality of impacting balls or media can be added to the impacting chamber of the energy impacting apparatus. These impacting balls, accelerated by the impacting apparatus, impinge upon the surfaces/edges of graphite particles with a high kinetic energy at a favorable angle to peel off graphene sheets from graphite particles. These graphene sheets are tentatively transferred to surfaces of these impacting balls. These graphene-supporting impacting balls subsequently collide with polymer particles and transfer the supported graphene sheets to the surfaces of these polymer particles. This sequence of events is herein referred to as the "indirect transfer" process. These events occur in very high frequency and, hence, most of the polymer particles are covered by graphene sheets typically in less than one hour. In some embodiments of the indirect transfer process, step (c) includes operating a magnet to separate the impacting balls or media from the graphene-coated or graphene-embedded polymer particles.

The method then includes recovering the graphene-coated or graphene-embedded polymer particles from the impacting chamber and consolidating the graphene-coated or graphene-embedded polymer particles into a desired shape of graphene-polymer composite structure. This consolidating step can be as simple as a compacting step that just mechanically packs graphene-coated or embedded particles into a desired shape. Alternatively, this consolidating step can entail melting the polymer particles to form a polymer matrix with graphene sheets dispersed therein. Such a graphene-polymer structure can be in any practical shape or dimensions (sheet, film, fiber, rod, plate, cylinder, or any regular shape or odd shape).

The graphene-polymer compact or composite structure is then pyrolyzed to thermally convert the polymer into carbon or graphite that bonds the graphene sheets to form the integral 3D graphene-carbon hybrid foam. This foam is then impregnated with a desired (usually small) amount of a desired lithium-attracting metal via various means (e.g. melt dipping, solution impregnation, chemical vapor infiltration, physical vapor infiltration, sputtering, electrochemical deposition, etc.). Alternatively, one may choose to incorporate a metal-containing precursor (e.g. an organo-metallic molecule) into the graphene-polymer compact or composite structure prior to pyrolyzation. During the subsequent pyrolyzation (heat treatments), the precursor is thermally converted or reduced to a metal phase residing in the pores of the foam or adhering to pore walls.

Such a graphene-carbon-metal foam structure can be already in the final shape and dimensions of a desired electrode, or can be cut and trimmed into a final shape and dimensions of a desired electrode. Such an electrode can be pre-lithiated or attached to a lithium foil and then directly impregnated with an electrolyte to form an electrolyte-impregnated foam electrode layer (e.g. anode). The anode layer, a separator, and a cathode layer can then be laminated (with or without an anode current collector and/or cathode current collector) to form a lithium battery cell, which is then packaged in an envelope or casing (e.g. laminated plastic-aluminum housing). Alternatively, an un-impregnated anode layer, a separator layer, and an un-impregnated cathode layer are laminated together (with or without externally added current collectors) to form a battery cell, which is inserted in a housing and impregnated with an electrolyte to form a packaged lithium battery cell.

For the formation of the carbon component of the integral 3D graphene-carbon hybrid foam, one can choose polymer particles that have a high carbon yield or char yield (e.g. >30% by weight of a polymer being converted to a solid carbon phase; instead of becoming part of a volatile gas). The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof. When pyrolyzed, particles of these polymers become porous, as illustrated in the bottom portion of FIG. 2(B).

If a lower carbon content (higher graphene proportion relative to carbon proportion) and lower foam density are desired in the graphene-carbon hybrid foam, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidiene fluoride (PVDF), polytetrafluoroethylene (PTFE), polyphenylene oxide (PPO), poly methyl methacrylate (PMMA), a copolymer thereof, a polymer blend thereof, or a combination thereof. When pyrolyzed, particles of these polymers become porous, as illustrated in the middle portion of FIG. 2(B).

These polymers (of both high and low carbon yields), when heated at a temperature of 300-2,500° C., are converted into a carbon material, which is preferentially nucleated near graphene sheet edges. Such a carbon material naturally bridges the gaps between graphene sheets, forming interconnected electron-conducting pathways. In actuality, the resulting graphene-carbon hybrid foam is composed of integral 3D network of carbon-bonded graphene sheets, enabling continuous transport of electrons and phonons (quantized lattice vibrations) between graphene sheets or domains without interruptions. When further heated at a temperature higher than 2,500° C., the carbon phase can get graphitized to further increase both the electric conductivity and thermal conductivity. The amount of non-carbon elements is also decreased to typically below 1% by weight if the graphitization time exceeds 1 hour.

It may be noted that an organic polymer typically contains a significant amount of non-carbon elements, which can be reduced or eliminated via heat treatments. As such, pyrolyzation of a polymer causes the formation and evolution of volatile gas molecules, such as $CO_2$ and $H_2O$, which lead to the formation of pores in the resulting polymeric carbon phase. However, such pores also have a high tendency to get collapsed if the polymer is not constrained when being carbonized (the carbon structure can shrink while non-carbon elements are being released). We have surprising discovered that the graphene sheets wrapped around a polymer particle are capable of constraining the carbon pore walls from being collapsed. In the meantime, some carbon species also permeate to the gaps between graphene sheets where these species bond the graphene sheets together. The pore sizes and pore volume (porosity level) of the resulting 3D integral graphene foam mainly depend upon the starting polymer size and the carbon yield of the polymer.

The graphitic material, as a source of graphene sheets, may be selected from natural graphite, synthetic graphite, highly oriented pyrolytic graphite, graphite fiber, graphitic nano-fiber, graphite fluoride, oxidized graphite, chemically modified graphite, exfoliated graphite, recompressed exfoliated graphite, expanded graphite, meso-carbon micro-bead, or a combination thereof. In this regard, there are several additional surprising elements associated with the presently invented process:

(1) Graphene sheets can be peeled off from natural graphite by using polymer particles alone, without utilizing the heavier and harder impacting balls (such as zirconium dioxide or steel balls commonly used in a ball mill, for instance). The peeled-off graphene sheets are directly transferred to polymer particle surfaces and are firmly wrapped around the polymer particles.

(2) It is also surprising that impacting polymer particles are capable of peeling off graphene sheets from artificial graphite, such as meso-carbon micro-beads (MCMBs), which are known to have a skin layer of amorphous carbon.

(3) With the assistance of harder impacting balls, the graphene-like planes of carbon atoms constituting the internal structure of a carbon or graphite fiber can also be peeled off and transferred to the polymer particle surfaces. This has never been taught or suggested in prior art.

(4) The present invention provides a strikingly simple, fast, scalable, environmentally benign, and cost-effective process that avoids essentially all of the drawbacks associated with prior art processes of producing graphene sheets. The graphene sheets are immediately transferred to and wrapped around the polymer particles, which are then readily converted to integral 3D graphene-carbon hybrid foam.

A certain desired degree of hydrophilicity can be imparted to the pore walls of the graphene-carbon hybrid foam if the starting graphite is intentionally oxidized to some degree (e.g. to contain 2-15% by weight of oxygen). Alternatively, one can attach oxygen-containing functional groups to the carbon phase if the carbonization treatment is allowed to occur in a slightly oxidizing environment.

If a high electrical or thermal conductivity is desired, the graphitic material may be selected from a non-intercalated and non-oxidized graphitic material that has never been previously exposed to a chemical or oxidation treatment prior to being placed into the impacting chamber. Alternatively or additionally, the graphene-carbon foam can be subjected to graphitization treatment at a temperature higher than 2,500° C. The resulting material is particularly advantageous for use as a supercapacitor electrode due to its high electrical conductivity (meaning exceptionally low internal resistance). A low equivalent series resistance in a supercapacitor cell is essential to achieving a high power density.

The graphene-carbon foam may be subjected to compression during and/or after the graphitization treatment. This operation enables us to adjust the graphene sheet orientation and the degree of porosity.

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}$=0.3354 g+0.344 (1−g), where $d_{002}$ is the interlayer spacing of graphite or graphene crystal in nm. This equation is valid only when $d_{002}$ is equal or less than approximately 0.3440 nm. The graphene foam walls having a $d_{002}$ higher than 0.3440 nm reflects the presence of oxygen- or fluorine-containing functional groups (such as —F, —OH, >O, and —COOH on graphene molecular plane surfaces or edges) that act as a spacer to increase the inter-graphene spacing.

Another structural index that can be used to characterize the degree of ordering of the stacked and bonded graphene planes in the foam walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

In-depth studies using a combination of SEM, TEM, selected area diffraction, X-ray diffraction, AFM, Raman spectroscopy, and FTIR indicate that the graphene foam walls are composed of several huge graphene planes (with length/width typically >>20 nm, more typically >>100 nm, often >>1 μm, and, in many cases, >>10 μm, or even >>100 μm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

The integral 3D graphene-carbon hybrid foam is composed of multiple pores and pore walls, wherein the pore walls contain single-layer or few-layer graphene sheets chemically bonded by a carbon material having a carbon material-to-graphene weight ratio from 1/100 to 1/2, wherein the few-layer graphene sheets have 2-10 layers of stacked graphene planes having an inter-plane spacing $d_{002}$ from 0.3354 nm to 0.36 nm as measured by X-ray diffraction and the single-layer or few-layer graphene sheets contain a pristine graphene material having essentially zero % of non-carbon elements, or a non-pristine graphene material having 0.01% to 25% by weight of non-carbon elements (more typically <15%) wherein the non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof. A plurality of single-layer or few layer graphene embracing the underlying polymer particles can overlap with one another to form a stack of graphene sheets. The stack can have a thickness greater than 5 nm and, in some cases, greater than 10 nm or even greater than 100 nm.

The integral 3D graphene-carbon hybrid foam, prior to metal impregnation, typically has a density from 0.001 to 1.7 g/cm$^3$, a specific surface area from 50 to 3,000 m$^2$/g, a thermal conductivity of at least 200 W/mK per unit of specific gravity, and/or an electrical conductivity no less than 2,000 S/cm per unit of specific gravity. In a preferred embodiment, the pore walls contain stacked graphene planes having an inter-planar spacing $d_{002}$ from 0.3354 nm to 0.40 nm as measured by X-ray diffraction.

Many of the graphene sheets can be merged edge to edge through covalent bonds with one another, into an integrated graphene entity. The gaps between the free ends of those unmerged sheets or shorter merged sheets are bonded by the carbon phase converted from a polymer. Due to these unique chemical composition (including oxygen or fluorine content, etc.), morphology, crystal structure (including inter-graphene spacing), and structural features (e.g. degree of orientations, few defects, chemical bonding and no gap between graphene sheets, and substantially no interruptions along graphene plane directions), the graphene-carbon hybrid foam has a unique combination of outstanding thermal conductivity, electrical conductivity, mechanical strength, and stiffness (elastic modulus).

The aforementioned features and characteristics make the integral 3D graphene-carbon-metal hybrid foam an ideal battery anode for the following reasons.

1) Since graphene sheets are bonded by a carbon phase to form an integral 3D network of graphene planes and inter-dispersing pores, there is no possibility for otherwise isolated/separated graphene sheets to get re-stacked together (thereby reducing the specific surface area). Re-stacking of graphene sheets can reduce the surface area and increase the exchange current density, which otherwise are not favorable to improved resistance to lithium dendrite formation.
2) Such a 3D network of graphene sheets bridged with a carbon phase also provides a 3D network of electron-conducting pathways without interruption, allowing for low resistance to electron transport.

3) There are no externally added conductive additives (such as ethylene black) and no resin binder used, which implies a minimal amount of non-active materials (materials that otherwise add extra weights and volumes to the battery cell without adding energy storage capacity).
4) There is the flexibility of impregnating the hybrid foam electrode with the electrolyte before or after the electrode is laminated with the counter electrode and a separator layer into a cell. A surprisingly advantageous feature of this hybrid foam structure is the flexibility of making the pores initially large in size and chemically wettable and accessible to the electrolyte fluid. Once a desired amount of electrolyte is impregnated, the impregnated foam can be compressed to reduce the pore sizes and the electrode thickness and volume (without reducing the specific surface area of the graphene sheets). This feature now makes it possible to achieve both a high specific surface area and a high tap density of an electrode, which are normally considered mutually exclusive in prior art battery electrodes. It is now possible to achieve both high volumetric energy density and high gravimetric energy density.
5) The 3D graphene-carbon hybrid structure and chemistry can be readily adjusted to accept a lithium-attracting metal.
6) Thus, the presently invented process exhibits a host of many totally unexpected advantages over the conventional lithium metal battery cell production process.

The lithium-attracting metal material can contain a metal selected from Ti, V, Cr, Mn, Fe, Co, Ni, Cu, Zn, Zr, Mo, Pd, Ag, Cd, Au, Pt, W, Al, Sn, In, Pb, Bi, an alloy thereof, or a mixture thereof. Any transition metal can be used, but preferably, the metal is selected from Cu, Al, Ti, Sn, Ag, Au, Fe, or an alloy thereof.

The step of impregnating the porous graphitic film with a metal or metal alloy can include an operation of electrochemical deposition or plating, pulse power deposition, solution impregnation, electrophoretic deposition, electroless plating or deposition, metal melt impregnation, metal precursor impregnation, chemical deposition, physical vapor deposition, physical vapor infiltration, chemical vapor deposition, chemical vapor infiltration, sputtering, or a combination thereof. These individual operations per se are well-known in the art. For instance, for electrochemical deposition, one may impose a DC current by connecting the porous graphitic film to one terminal (e.g. negative electrode) and a piece of the desired metal (e.g. Cu, Zn, or Ni) to the opposite terminal (e.g. positive electrode) in an electrochemical chamber (e.g. just a simple bath containing an electrolyte).

Electrolyte is an important ingredient in a battery. A wide range of electrolytes can be used for practicing the instant invention. Most preferred are non-aqueous, polymer gel, and solid-state electrolytes although other types can be used. Polymer, polymer gel, and solid-state electrolytes are preferred over liquid electrolyte.

The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) effective in suppressing the reductive or oxidative decomposition of electrolyte; and (b) high in conductivity. A non-aqueous electrolyte solely composed of ethylene carbonate (EC) is advantageous in that it is relatively stable against carbonaceous filament materials. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.25 to 5 mol/l, and more preferably 0.5 to 3.5 mol/l.

For sodium metal batteries, the organic electrolyte may contain an alkali metal salt preferably selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), bis-trifluoromethyl sulfonylimide potassium ($KN(CF_3SO_2)_2$), an ionic liquid salt, or a combination thereof.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a battery.

The cathode active material may be selected from a wide variety of oxides, such as lithium-containing nickel oxide, cobalt oxide, nickel-cobalt oxide, vanadium oxide, and lithium iron phosphate. These oxides may contain a dopant, which is typically a metal element or several metal elements. The cathode active material may also be selected from chalcogen compounds, such as titanium disulfate, molybdenum disulfate, and metal sulfides. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium manganese-iron phosphate, lithium vanadium phosphate, and the like. Sulfur or lithium polysulfide may also be used in a Li—S cell.

The rechargeable lithium metal batteries can make use of non-lithiated compounds, such as $TiS_2$, $MoS_2$, $MnO_2$, $CoO_2$, $V_3O_8$, and $V_2O_5$, as the cathode active materials. The lithium vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. In general, the inorganic material-based cathode materials may be selected from a metal carbide, metal nitride, metal boride, metal dichalcogenide, or a combination thereof. Preferably, the desired metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. These materials can be in the form of a simple mixture with sheets of a graphene material, but preferably in a nano particle or nano coating form that that is physically or chemically bonded to a surface of the graphene sheets.

Preferably, the cathode active material for a sodium metal battery contains a sodium intercalation compound or a potassium intercalation compound selected from $NaFePO_4$, $KFePO_4$, $Na_{(1-x)}K_xPO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}CO_{1/3}O_2$, $Cu_{0.56}Ni_{0.44}HCF$, NiHCF, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$ (y/z=0.01 to 100), Se, Alluaudites, or a combination thereof, wherein x is from 0.1 to 1.0.

The organic material or polymeric material-based cathode materials may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, $Na_xC_6O_6$ (x=1-3), $Na_2(C_6H_2O_4)$, $Na_2C_8H_4O_4$ (Na terephthalate), $Na_2C_6H_4O_4$(Li trans-trans-muconate), or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio) benzene] (PTKPTB, or poly[3,4(ethylenedithio)thiophene] (PEDTT).

The organic material that can be used as a cathode active material in a lithium metal battery or sodium metal battery may include a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The following examples are used to illustrate some specific details about the best modes of practicing the instant invention and should not be construed as limiting the scope of the invention.

Example 1: Production of Graphene-Carbon Hybrid Foam from Flake Graphite Via Polypropylene Powder-Based Solid Polymer Carrier Particles In an experiment, 1 kg of polypropylene (PP) pellets, 50 grams of flake graphite, 50 mesh (average particle size 0.18 mm; Asbury Carbons, Asbury N.J.) and 250 grams of magnetic stainless steel balls were placed in a high-energy ball mill container. The ball mill was operated at 300 rpm for 2 hours. The container lid was removed and stainless steel balls were removed via a magnet. The polymer carrier material was found to be coated with a dark graphene layer. Carrier material was placed over a 50 mesh sieve and a small amount of unprocessed flake graphite was removed.

Figure 3A:
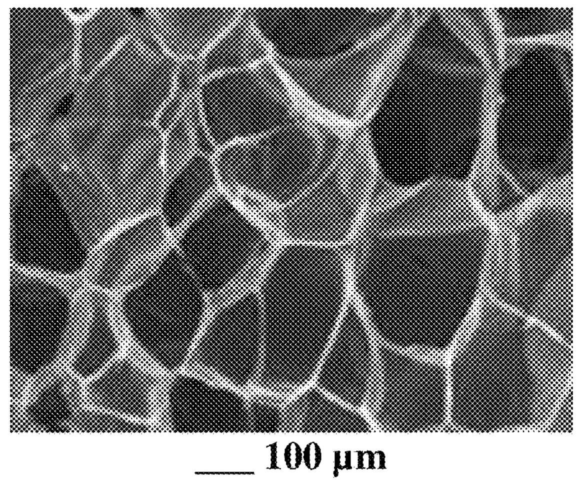
FIG. 3(A) An SEM image of an internal structure of a 3D graphene-carbon hybrid foam prior to metal impregnation.
Figure 3B:
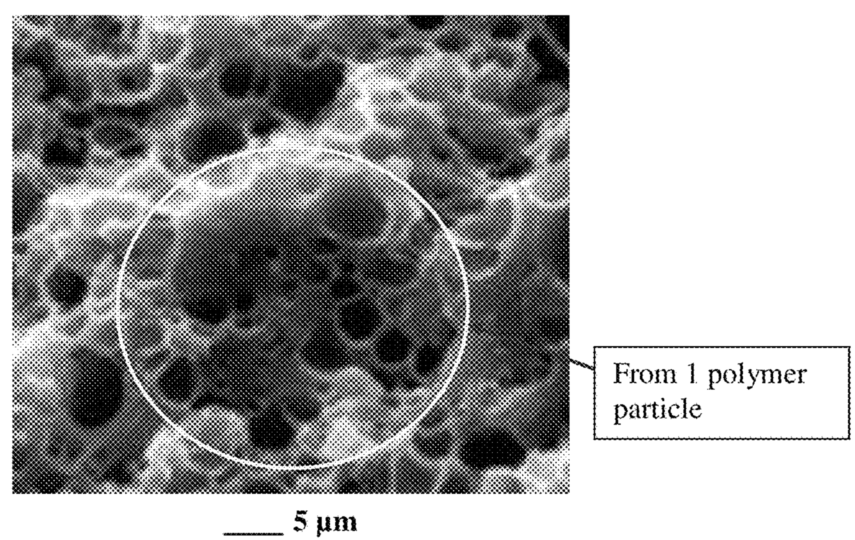
FIG. 3(B) An SEM image of an internal structure of another 3D graphene-carbon hybrid foam without metal impregnation.

A sample of the coated carrier material was then immersed in tetrachloroethylene at 80° C. for 24 hours to dissolve PP and allow graphene sheets to disperse in the organic solvent for the purpose of determining the nature of graphene sheets produced. After solvent removal, isolated graphene sheet powder was recovered and was found to be mostly few-layer graphene sheets. The remaining graphene-coated PP carrier particles were then compacted in a mold cavity to form a green compact, which was then heat-treated in a sealed crucible at 350° C. and then at 600° C. for 2 hours to produce a sample of graphene-carbon foam. The foam produced is shown in FIG. 3(A) and FIG. 3(B).

In a separate experiment, the same batch of PP pellets and flake graphite particles (without the impacting steel balls) were placed in the same high-energy ball mill container and the ball mill was operated under the same conditions for the same period of time. The results were compared with those obtained from impacting ball-assisted operation. The separate graphene sheets isolated from PP particles, upon PP dissolution, are mostly single-layer graphene. The graphene-carbon foam produced from this process has a higher level of porosity (lower physical density).

Although polypropylene (PP) is herein used as an example, the carrier material for graphene-carbon hybrid foam production is not limited to PP. It could be any polymer provided the polymer can be made into a particulate form. We have also conducted experiments using particles of thermoplastic, thermoset, rubber, wax, mastic, gum, and organic resin, etc. as carrier particles without using externally added impacting balls. It may be noted that un-cured or partially cured thermosetting resins (such as epoxide and imide-based oligomers or rubber) can be made into a particle form at room temperature or lower (e.g. cryogenic temperature). Hence, even partially cured thermosetting resin particles can be used as a polymer carrier.

For incorporation of higher melting point metals (e.g. Au, Ag, Ni, Co, Mn, Fe, and Ti) as a lithium- or sodium-attracting metal in an integral graphene-carbon foam, a small but controlled amount of the desired metal was deposited on the surfaces of carrier polymer particles. These metal-coated polymer particles were then utilized as the impacting media (without using any externally added milling media, such as zirconia beads). Graphene sheets were peeled off from graphite particle surfaces, sticking to the metal coating surface and embracing the underlying polymer particles. These particles were compacted together and then subjected to pyrolyzation (carbonization) to convert polymer into carbon. Surprisingly, carbon atoms were able to permeate around the metal coating layer to bond together graphene sheets, thereby forming a graphene-carbon-metal hybrid foam structure.

For incorporation of lower melting metals, such as Mg, Zn, Na, K, and Sn, metal melt impregnation or electrochemical infiltration (plating) was implemented after the graphene-carbon foam was formed. It may be noted that electrochemical method is applicable to all metals.

We have observed that it is easier for the single-layer graphene wall-based graphene-carbon foam to get impregnated with the desired lithium- or sodium-attracting metal, as compared to multi-layer graphene based foam. Further, the single-layer graphene wall-based foams, having a high specific surface area, are found to be more effective in suppressing dendrite formation.

In order to determine the relative stability of the graphene-carbon-metal hybrid foam-based anode structure, the voltage profiles of symmetric layered Li-foam electrode cells, symmetric layered Li-foam (metal free) electrode cells, and the bare Li foil counterparts were obtained through over 200 cycles at nominal current density of 1 $mA/cm^2$ (foam specific surface area not taken into account, just plain electrode surface area). The symmetric layered Li-foam electrode cells exhibited stable voltage profiles with negligible hysteresis, whereas the bare Li foils displayed a rapid increase in hysteresis during cycling, by almost 100% after 100 cycles. The hysteresis growth rate of symmetric layered Li-foam (metal free) electrode cells is significantly greater than that of symmetric layered Li-foam electrode cells, but lower than that of the bare Li foils. For symmetric layered Li-foam electrode cells, flat voltage plateau at both the charging and discharging states can be retained throughout the whole cycle without obvious increases in hysteresis. This is a significant improvement compared with bare Li electrodes, which showed fluctuating voltage profiles with consistently higher overpotential at both the initial and final stages of each stripping/plating process. After 300 cycles, there is no sign of dendrite formation and the lithium deposition is very even in symmetric layered Li-foam electrode cells. For the symmetric layered Li-foam (metal-free) electrode cells, some lithium tends to deposit unevenly on external surfaces of pores, instead of fully entering the pores. Typically, for bare Li foil electrodes, dendrite begins to develop in less than 30 cycles.

Example 2: Graphene-Carbon Hybrid Foam Using Expanded Graphite (>100 nm in Thickness) as the Graphene Source and Acrylonitrile-Butadiene-Styrene Copolymer (ABS) as the Polymer Solid Carrier Particles In an experiment, 100 grams of ABS pellets, as solid carrier material particles, were placed in a 16 oz plastic container along with 5 grams of expanded graphite. This container was placed in an acoustic mixing unit (Resodyn Acoustic mixer) and processed for 30 minutes. After processing, particles of the carrier material were found to be coated with a thin layer of carbon. A small sample of carrier material was placed in acetone and subjected to ultrasound energy to speed dissolution of the ABS. The solution was filtered using an appropriate filter and washed four times with additional acetone. Subsequent to washing, filtrate was dried in a vacuum oven set at 60° C. for 2 hours. This sample was examined by optical microscopy and Raman spectroscopy, and found to be graphene. The remaining pellets were extruded to create graphene-polymer sheets (1 mm thick), which were then carbonized to prepare graphene-carbon foam samples under different temperature and compression conditions. The graphene-carbon foams were then impregnated with a small amount of lithium- or sodium-attracting metal (0.1% to 30% by weight of Mg, Zn, Na, K, and Sn).

Example 3: Production of Graphene-Carbon Hybrid Foam from Meso-Carbon Micro Beads (MCMBs) as the Graphene Source Material)) and Polyacrylonitrile (PAN) Fibers (as Solid Carrier Particles)

In one example, 100 grams of PAN fiber segments (2 mm long as the carrier particles), 5 grams of MCMBs (China Steel Chemical Co., Taiwan), and 50 grams of zirconia beads were placed in a vibratory ball mill and processed for 2 hours. After the process was completed, the vibratory mill was then opened and the carrier material was found to be coated with a dark coating of graphene sheets. The zirconia particles, having distinctly different sizes and colors were manually removed. The graphene-coated PAN fibers were then compacted and melted together to form several composite films. The films were subjected to a heat treatment at 250° C. for 1 hour (in room air), 350° C. for 2 hours, and 1,000° C. for 2 hours (under an argon gas atmosphere) to obtain graphene-carbon foam layers. Half of the carbonized foam layers were then heated to 2,850° C. and maintained at this temperature for 0.5 hours. The graphene-carbon foams were then impregnated with a small amount of lithium- or sodium-attracting metal (0.1% to 35% by weight of Mg, Zn, Na, K, Li, and Sn).

Example 4: Particles of Cured Phenolic Resin as the Polymer Carrier in a Freezer Mill In one experiment, 10 grams of Ag-coated or Au-coated phenolic resin particles were placed in a SPEX mill sample holder (SPEX Sample Prep, Metuchen, N.J.) along with 0.25 grams of HOPG powder derived from graphitized polyimide and a magnetic stainless steel impactor. The same experiment was performed, but the sample holder did not contain any impactor balls. These processes were carried out in a 1%-humidity "dry room" to reduce the condensation of water onto the completed product. The SPEX mill was operated for 10-120 minutes. After operation, the contents of the sample holder were sorted to recover graphene-coated resin particles by removing residual HOPG powder and impactor balls (when used).

The resulting graphene-wrapped and metal-coated resin particles in both cases (with or without impactor balls) were examined using both digital optical microscopy and scanning electron microscopy (SEM). It was observed that the thickness of the graphene sheets wrapped around resin particles increases with the milling operation time and, given the same duration of operation, the impactor-assisted operation leads to thicker graphene coating.

A mass of graphene-wrapped metal-coated resin particles was compressed to form a green compact, which was then subjected to pyrolysis treatments at 400° C. and then 1,000° C. to produce graphene-carbon-metal foam containing Ag or Au coated on graphene pore walls.

Example 5: Natural Graphite Particles as the Graphene Source, Polyethylene (PE) and Nylon 6/6 Beads as the Solid Carrier Particles, and Optional Ceramic or Glass Beads as Added Impacting Balls In an experiment, 0.5 kg of PE or nylon beads (as a solid carrier material), 50 grams of natural graphite (source of graphene sheets) and 250 grams of zirconia powder (impacting balls) were placed in containers of a planetary ball mill. The ball mill was operated at 300 rpm for 4 hours. The container lid was removed and zirconia beads (different sizes and weights than graphene-coated PE beads) were removed through a vibratory screen. The polymer carrier material particles were found to be coated with a dark graphene layer. Carrier material was placed over a 50 mesh sieve and a small amount of unprocessed flake graphite was removed. In a separate experiment, glass beads were used as the impacting balls; other ball-milling operation conditions remained the same.

A mass of graphene-coated PE pellets and a mass of graphene-coated nylon beads were separately compacted in a mold cavity and briefly heated above the melting point of PE or nylon and then rapidly cooled to form two green compacts. For comparison purposes, two corresponding compacts were prepared from a mass of un-coated PE pellets and a mass of un-coated nylon beads. These 4 compacts were then subjected to pyrolyzation (by heating the compacts in a chamber from 100° C. to 650° C.). The results were very surprising. The compacts of graphene-coated polymer particles were found to be converted to graphene-carbon hybrid foam structures having dimensions comparable to the dimensions of the original compacts (3 cm×3 cm×0.5 cm). SEM examination of these structures indicates that carbon phases are present near the edges of graphene sheets and these carbon phases act to bond the graphene sheets together. The carbon-bonded graphene sheets form a skeleton of graphene-carbon hybrid pore walls having pores being present in what used to be the space occupied by the original polymer particles, as schematically illustrated in FIG. 2(A).

In contrast, the two compacts from un-coated pellets or beads shrank to become essentially two solid masses of carbon having a volume approximately 15%-20% of the original compact volumes. These highly shrunk solid masses are practically pore-free carbon materials; they are not a foam material.

The graphene-carbon foams were then electrochemically impregnated with a small amount of lithium- or sodium-attracting metal (0.1% to 35% by weight of Mg, Zn, Na, K, Li, and Sn).

Examples 6: Micron-Sized Rubber Particles as the Solid Polymer Carrier Particles The experiment began with preparation of micron-sized rubber particles. A mixture of methylhydro dimethyl-siloxane polymer (20 g) and polydimethylsiloxane, vinyldimethyl terminated polymer (30 g) was obtained by using a homogenizer under ambient conditions for 1 minute. Tween 80 (4.6 g) was added and the mixture was homogenized for 20 seconds. Platinum-divinyltetramethyldisiloxane complex (0.5 g in 15 g methanol) was added and mixed for 10 seconds. This mixture was added to 350 g of distilled water and a stable latex was obtained by homogenization for 15 minutes. The latex was heated to 60° C. for 1.5 hours. The latex was then de-emulsified with anhydrous sodium sulfate (20 g) and the silicone rubber particles were Obtained by filtration under a vacuum, washing with distilled water, and drying under vacuum at 25° C. The particle size distribution of the resulting rubber particles was 3-11 μm.

In one example, 10 grams of rubber particles, 2 grams of natural graphite, and 5 grams of zirconia beads were placed in a vibratory ball mill and processed for 2 hours. After the process was completed, the vibratory mill was then opened and the rubber particles were found to be coated with a dark coating of graphene sheets. The zirconia particles were manually removed. The graphene-coated rubber particles were then mixed with 5% by wt. of petroleum pitch (as a binder) and mechanically compacted together to form several composite sheets. The composite sheets were then subjected to a heat treatment at 350° C. for 1 hour, 650° C. for 2 hours, and 1,000° C. for 1 hour in a tube furnace to obtain graphene-carbon foam layers. The graphene-carbon foams were then electrochemically impregnated with a small amount of lithium- or sodium-attracting metal (0.1% to 35% by weight of Mg, Zn, Na, K, Li, and Sn).

Examples 7: Preparation of Graphene Fluoride-Carbon Hybrid Foams

In a typical procedure, a sheet of graphene-carbon hybrid foam was fluorinated by vapors of chlorine trifluoride in a sealed autoclave reactor to yield fluorinated graphene-carbon hybrid film. Different durations of fluorination time were allowed for achieving different degrees of fluorination. The graphene fluoride-carbon foams were then electrochemically impregnated with a small amount of lithium- or sodium-attracting metal (0.1% to 35% by weight of Mg, Zn, Na, K, Li, and Sn). Compared to pristine graphene and reduced graphene oxide-based foam, the graphene fluoride-carbon hybrid foams are found to be more chemically compatible with the commonly used electrolytes in lithium-ion battery industry.

Example 8: Preparation of Graphene Oxide-Carbon Hybrid Foam and Nitrogenated Graphene-Carbon Hybrid Foams Several pieces of graphene-carbon foam prepared in Example 3 were immersed in a 30% $H_2O_2$-water solution for a period of 2-48 hours to obtain graphene oxide (GO) foams, having an oxygen content of 2-25% by weight.

Some GO foam samples were mixed with different proportions of urea and the mixtures were heated in a microwave reactor (900 W) for 0.5 to 5 minutes. The products were washed several times with deionized water and vacuum dried. The products obtained were nitrogenated graphene foam. The nitrogen contents were from 3% to 17.5 wt. %, as measured by elemental analysis. The graphene-carbon foams were then electrochemically impregnated with a small amount of lithium- or sodium-attracting metal (0.1% to 35% by weight of Mg, Zn, Na, K, Li, and Sn).

Example 9: Thermal and Mechanical Testing Of Various Graphene Foams and Conventional Graphite Foam Samples from various conventional carbon or graphene foam materials were machined into specimens for measuring the thermal conductivity. The bulk thermal conductivity of meso-phase pitch-derived foam ranged from 67 W/mK to 151 W/mK. The density of the samples was from 0.31-0.61 g/cm$^3$. When weight is taken into account, the specific thermal conductivity of the pitch derived foam is approximately 67/0.31=216 and 151/0.61=247.5 W/mK per specific gravity (or per physical density).

The compression strength of the samples having an average density of 0.51 g/cm$^3$ was measured to be 3.6 MPa and the compression modulus was measured to be 74 MPa. By contrast, the compression strength and compressive modulus of the presently invented graphene-carbon foam samples having a comparable physical density are 6.2 MPa and 113 MPa, respectively.

Figure 4A:
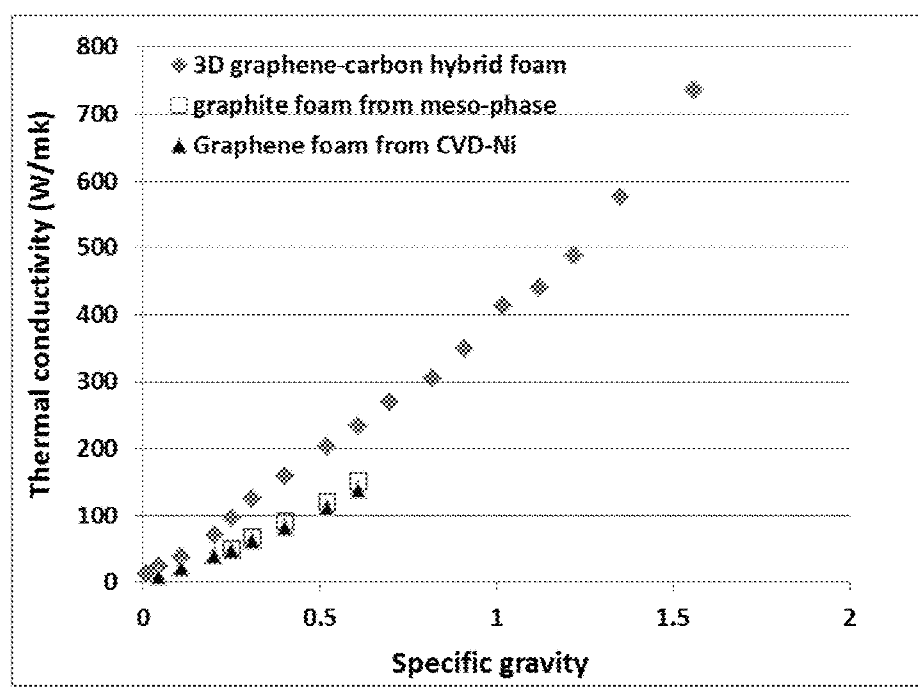
FIG. 4(A) Thermal conductivity values vs. specific gravity of a 3D integral graphene-carbon foam produced by the presently invented process, a meso-phase pitch-derived graphite foam, and a Ni foam-template assisted CVD graphene foam.
Figure 4B:
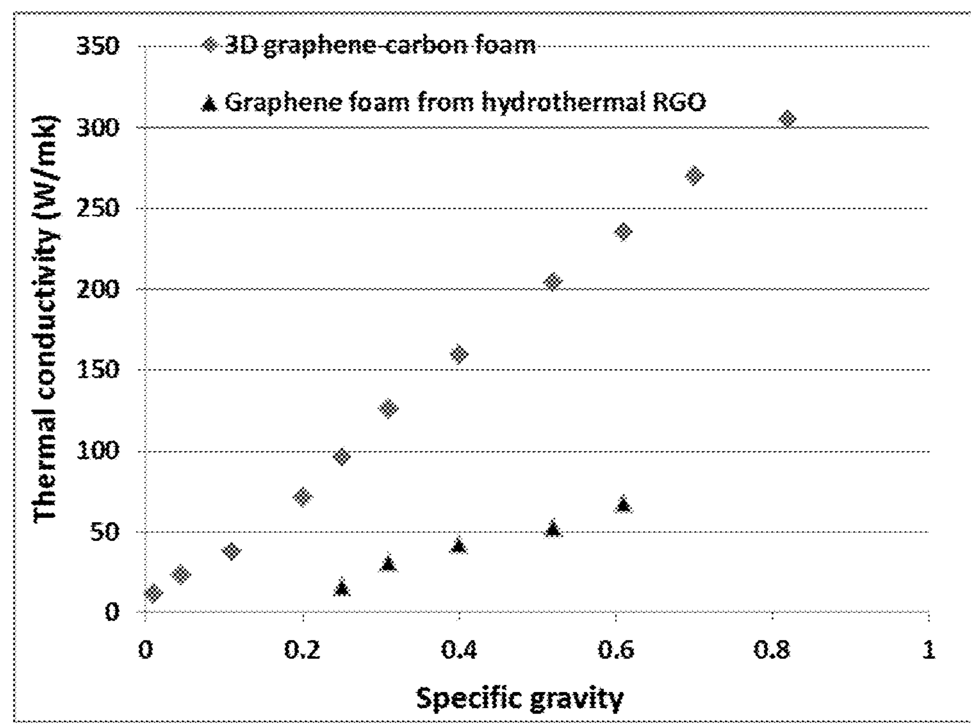
FIG. 4(B) Thermal conductivity values of 3D graphene-carbon foam and the hydrothermally reduced GO graphene foam.
Figure 5:
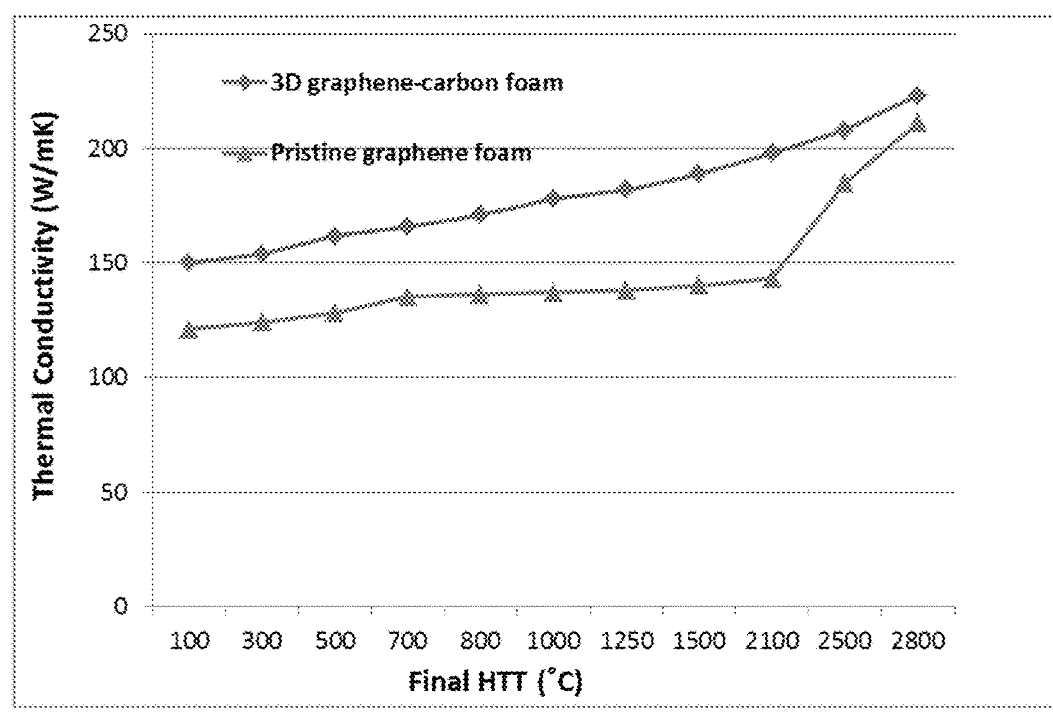
FIG. 5 Thermal conductivity values of 3D graphene-carbon hybrid foam and pristine graphene foam (prepared by casting with a blowing agent and then heat treating) plotted as a function of the final (maximum) heat treatment temperature.
Figure 6:
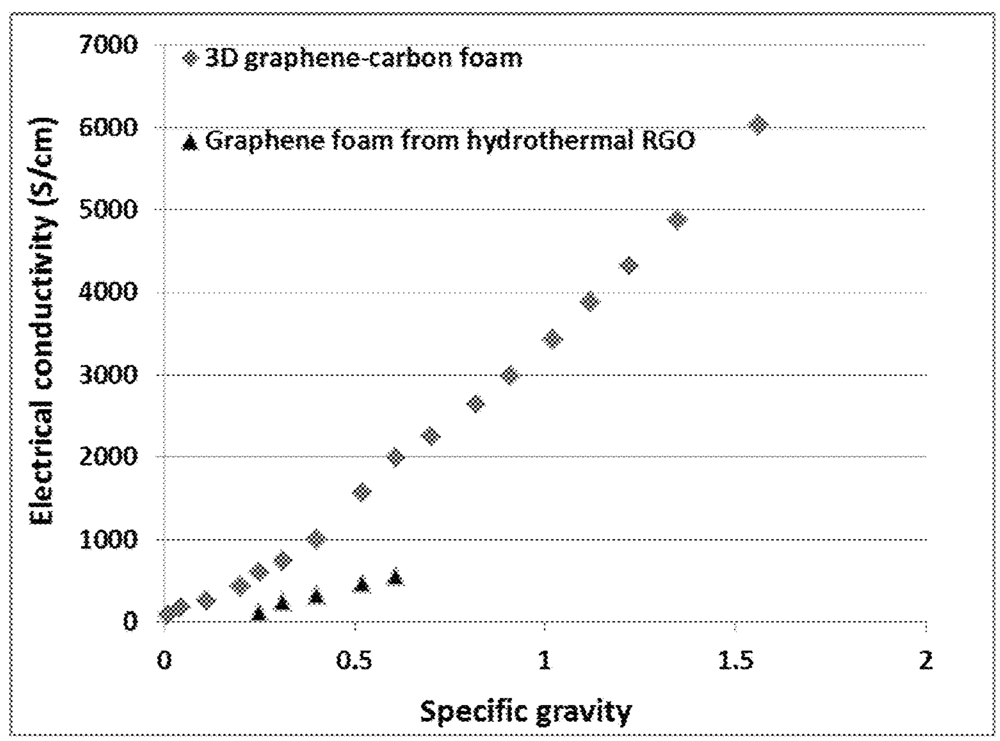
FIG. 6 Electrical conductivity values of 3D graphene-carbon foam and the hydrothermally reduced GO graphene foam.

Shown in FIG. 4(A) are the thermal conductivity values vs. specific gravity of the 3D graphene-carbon foam, meso-phase pitch-derived graphite foam, and Ni foam template-assisted CVD graphene foam. These data clearly demonstrate the following unexpected results:

1) The 3D integral graphene-carbon foams produced by the presently invented process exhibit significantly higher thermal conductivity as compared to both meso-phase pitch-derived graphite foam and Ni foam template-assisted CVD graphene, given the same physical density.
2) This is quite surprising in view of the notion that CVD graphene is essentially pristine graphene that has never been exposed to oxidation and should have exhibited a high thermal conductivity compared to our graphene-carbon hybrid foam. The carbon phase of the hybrid foam is in general of low degree of crystallinity (some being amorphous carbon) and, thus, has much lower thermal or electrical conductivity as compared with graphene alone. However, when the carbon phase is coupled with graphene sheets to form an integral structure produced by the presently invented method, the resulting hybrid form exhibits a thermal conductivity as compared to an all-pristine graphene foam. These exceptionally high thermal conductivity values observed with the graphene-carbon hybrid foams herein produced are much to our surprise. This is likely due to the observation that the otherwise isolated graphene sheets are now bonded by a carbon phase, providing a bridge for the uninterrupted transport of electrons and phonons.
3) The specific conductivity values of the presently invented hybrid foam materials exhibit values from 250 to 500 W/mK per unit of specific gravity; but those of other types of foam materials are typically lower than 250 W/mK per unit of specific gravity.
4) Summarized in FIG. 5 are thermal conductivity data for a series of 3D graphene-carbon foams and a series of pristine graphene derived foams, both plotted over the final (maximum) heat treatment temperatures. In both types of materials, the thermal conductivity increases monotonically with the final HTT. However, the presently invented process enables the cost-effective and environmentally benign production of graphene-carbon foams that outperform pristine graphene foams. This is another unexpected result.
5) FIG. 4(B) shows the thermal conductivity values of the presently invented hybrid foam and hydrothermally reduced GO graphene foam. Electrical conductivity values of 3D graphene-carbon foam and the hydrothermally reduced GO graphene foam are shown in FIG. 6. These data further support the notion that, given the same amount of solid material, the presently invented graphene-carbon foam is intrinsically most conducting, reflecting the significance of continuity in electron and phonon transport paths. The carbon phase bridges the gaps or interruptions between graphene sheets.

Example 10: Characterization of Various Graphene Foams and Conventional Graphite Foam The internal structures (crystal structure and orientation) of several series of graphene-carbon foam materials were investigated using X-ray diffraction. The X-ray diffraction curve of natural graphite typically exhibits a peak at approximately 2θ=26°, corresponds to an inter-graphene spacing ($d_{002}$) of approximately 0.3345 nm. The graphene walls of the hybrid foam materials exhibit a $d_{002}$ spacing typically from 0.3345 nm to 0.40 nm, but more typically up to 0.34 nm.

With a heat treatment temperature of 2,750° C. for the foam structure under compression for one hour, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio<0.1, for all graphitic materials heat treated at a temperature lower than 2,800° C. The I(004)/I(002) ratio for the graphitic materials heat treated at 3,000-3,250° C. (e.g., highly oriented pyrolytic graphite, HOPG) is in the range of 0.2-0.5. In contrast, a graphene foam prepared with a final HTT of 2,750° C. for one hour exhibits a I(004)/I(002) ratio of 0.78 and a Mosaic spread value of 0.21, indicating the pore walls being a practically perfect graphene single crystal with a good degree of preferred orientation (if prepared under a compression force).

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our graphene foams have a mosaic spread value in this range of 0.3-0.6 when produced using a final heat treatment temperature no less than 2,500° C.

The following are a summary of some of the more significant results:

1) In general, the addition of impacting balls helps to accelerate the process of peeling off graphene sheets from graphite particles. However, this option necessitates the separation of these impacting balls after graphene-coated polymer particles are made.
2) When no impacting balls (e.g. ceramic, glass, metal balls, etc.) are used, harder polymer particles (e.g. PE, PP, nylon, ABS, polystyrene, high impact polystyrene, etc. and their filler-reinforced versions) are more capable of peeling off graphene sheets from graphite particles, as compared to softer polymer particles (e.g. rubber, PVC, polyvinyl alcohol, latex particles).
3) Without externally added impacting balls, softer polymer particles tend to result in graphene-coated or embedded particles having 0.001% to 5% by weight of graphene (mostly single-layer graphene sheets) and harder polymer balls tend to lead to graphene-coated particles having 0.01% to 30% by weight of graphene (mostly single-layer and few layer graphene sheets), given the same 1 hour of operating time.
4) With externally added impacting balls, all polymer balls are capable of supporting from 0.001% to approximately 80% by weight of graphene sheets (mostly few-layer graphene, <10 layers, if over 30% by weight of graphene sheets).
5) The presently invented graphene-carbon hybrid foam materials typically exhibit significantly higher structural integrity (e.g. compression strength, elasticity, and resiliency) and higher thermal conductivities as compared to their counterparts produced by the conventional, prior art methods.
6) It is of significance to point out that all the prior art processes for producing graphite foams or graphene foams appear to provide macro-porous foams having a physical density only in the range of approximately 0.2-0.6 g/cm$^3$, with pore sizes being typically too large (e.g. from 20 to 300 μm) for most of the intended applications. In contrast, the instant invention provides processes that generate graphene foams having a density that can be as low as 0.001 g/cm$^3$ and as high as 1.7 g/cm$^3$. The pore sizes can be varied from microscopic (<2 nm), through meso-scaled (2-50 nm), and up to macro-scaled (e.g. from 1 to 500 μm). This level of flexibility and versatility in designing various types of graphene foams is unprecedented and un-matched by any prior art process.
7) The presently invented method also allows for convenient and flexible control over the chemical composition (e.g. F, O, and N contents, etc.), responsive to various application needs (e.g. oil recovery from oil-contaminated water, separation of an organic solvent from water or other solvents, heat dissipation, etc.).

Example 11: Additional Examples on Preparation of Integral Graphene-Carbon-Metal Foams Several procedures can be used to impregnate metal into the pores of graphene foams: electrochemical deposition or plating, pulse power deposition, electrophoretic deposition, electroless plating or deposition, metal melt impregnation (more convenient for lower-melting metals, such as Zn and Sn), metal precursor impregnation (impregnation of metal precursor followed by chemical or thermal conversion of precursor to metal), physical vapor deposition, physical vapor infiltration, chemical vapor deposition, chemical vapor infiltration, and sputtering.

For instance, purified zinc sulphate ($ZnSO_4$) is a precursor to Zn; zinc sulphate can be impregnated into pores via solution impregnation and then converted into Zn via electrolysis. In this procedure zinc sulphate solution was used as electrolyte in a tank containing a lead anode and a graphene foam cathode. Current is passed between the anode and cathode and metallic zinc is plated onto the cathodes by a reduction reaction.

Pure metallic Cu was synthesized (inside pores of graphene foams) by the reduction of cupric chloride with hydrazine in the aqueous CTAB solution. The use of ammonia solution for the adjustment of solution pH up to 10 and the use of hydrazine as a reducing agent in a capped reaction chamber were crucial for the synthesis of pure Cu. The reaction solution eventually became wine-reddish and its UV/vis absorption spectrum exhibited an absorption band at 574 nm, revealing the formation of metallic Cu.

Cu infiltration was also achieved with the chemical vapor deposition method using [Cu(OOCC2F5)(L)], L=vinyltrimethylsilane or vinyltriethylsilane as a precursor at a temperature of 400-700° C. The precursor Cu complexes were carried out using a standard Schlenk technique under the Ar atmosphere.

As an example of higher melting point metal, precursor infiltration and chemical conversion can be used to obtain metal impregnation. For instance, the hydrogenolysis of nickelocene can occur through a self-catalyzed process at low temperature (<70° C.) in supercritical carbon dioxide to generate relatively uniformly dispersed Ni metal film or particles in the pores of graphene foams. Nickelocene ($NiCp_2$) was used as the precursor and $H_2$ was used as the reducing agent. High-purity $CO_2$ and high-purity $H_2$ were used without further purification. The experiment was carried out in a high-pressure reactor (autoclave).

In a typical experiment, 70-90 mg $NiCp_2$ was loaded into the high-pressure reactor. Following precursor loading, low-pressure fresh $CO_2$ was used to purge the system for 10 min at 70° C. in order to purge air out of the reactor. After purging, high-pressure $CO_2$ was fed into the reactor through a high-pressure syringe pump. The temperature of the supercritical (sc) $CO_2$ solution was stabilized by a heating tape at the dissolving condition (T=70° C., P=17 MPa) for 4 h to form a uniform solution. During $NiCp_2$ dissolution, $H_2$ was fed into another clean, air-free high-pressure manifold vessel at a pressure of 3.5 MPa at 60° C. The vessel was then further charged with fresh $CO_2$ using the high-pressure syringe pump to a pressure of 34.5 MPa. This $H_2/scCO_2$ solution was kept stable at this condition for more than 2 h before being injected into the high-pressure reactor. Upon $H_2/scCO_2$ injection, the pressure in the vessel dropped from 34.5 to 13 MPa, allowing the amount of $H_2$ fed into the reactor to be quantified. The $H_2$ injection process was repeated to obtain a 50-100 molar excess of hydrogen relative to nickelocene in the reactor system. Upon the addition of $H_2$, the $scCO_2$ solution containing $NiCp_2$ maintained a green color and the reaction system was left undisturbed at 70° C., 17 MPa for 7-8 hours. After 7-8 h substantial Ni film deposition in the pores of graphitic films was obtained.

We have found that Zn (melting point=419.5° C.) and Sn (MP=231.9° C.) in the molten state readily permeate into pores or gaps (between graphene sheets or molecules) of the porous graphene foams prepared by heat-treating GO layers and the presently invented graphene-carbon foams.

Example 12: Evaluation of Various Lithium Metal and Sodium Metal Cells

In a conventional cell, an electrode (e.g. cathode) is typically composed of 85% an electrode active material (e.g. $MoS_2$, $V_2O_5$, inorganic nano discs, etc.), 5% Super-P (acetylene black-based conductive additive), and 10% PTFE, which were mixed and coated on Al foil. The thickness of electrode is around 50-150 μm. A wide variety of cathode active materials were implemented to produce lithium metal batteries and sodium metal batteries.

For each sample, both coin-size and pouch cells were assembled in a glove box. The charge storage capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

For each sample, several current density (representing charge/discharge rates) were imposed to determine the electrochemical responses, allowing for calculations of energy density and power density values required of the construction of a Ragone plot (power density vs. energy density).

Figure 7A:
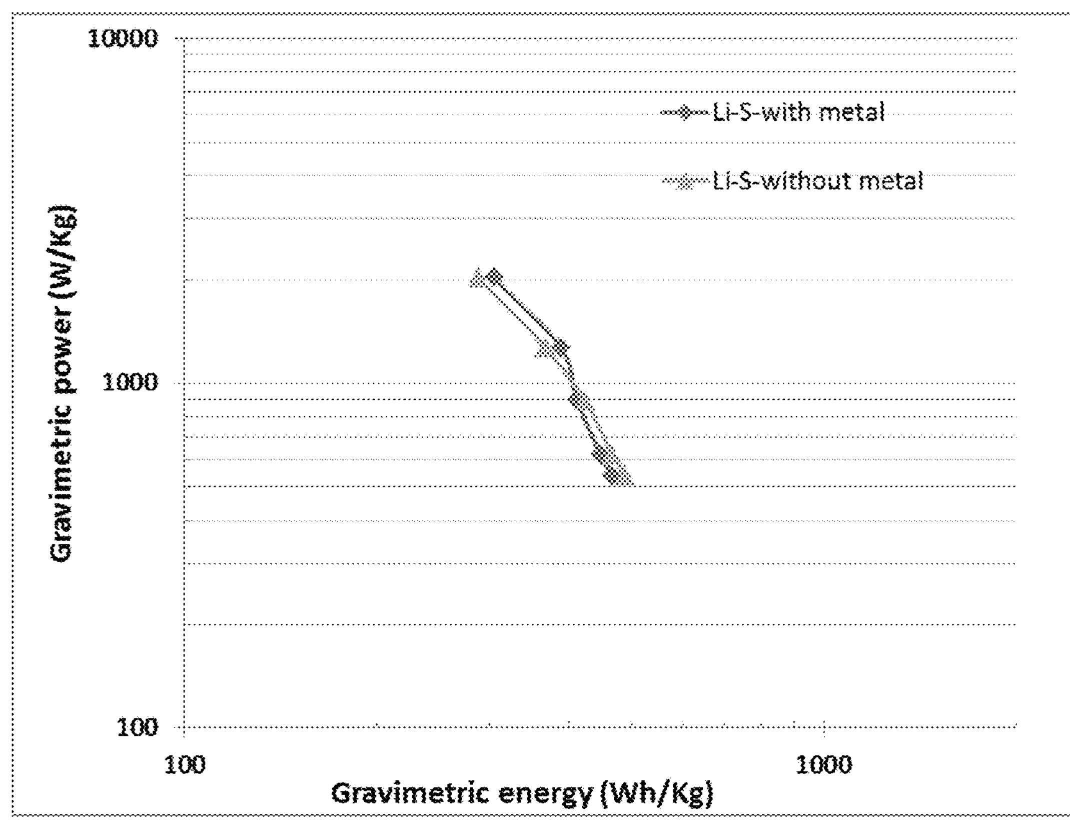
FIG. 7(A) Ragone plots (gravimetric power density vs. energy density) of two sets of lithium metal cells: (a) first cell containing nitrogen-doped graphene-carbon-metal (Zn) hybrid foam, in physical contact with a lithium foil, as the anode active material; (b) the second cell containing no lithium-attracting metal (Zn).
Figure 7B:
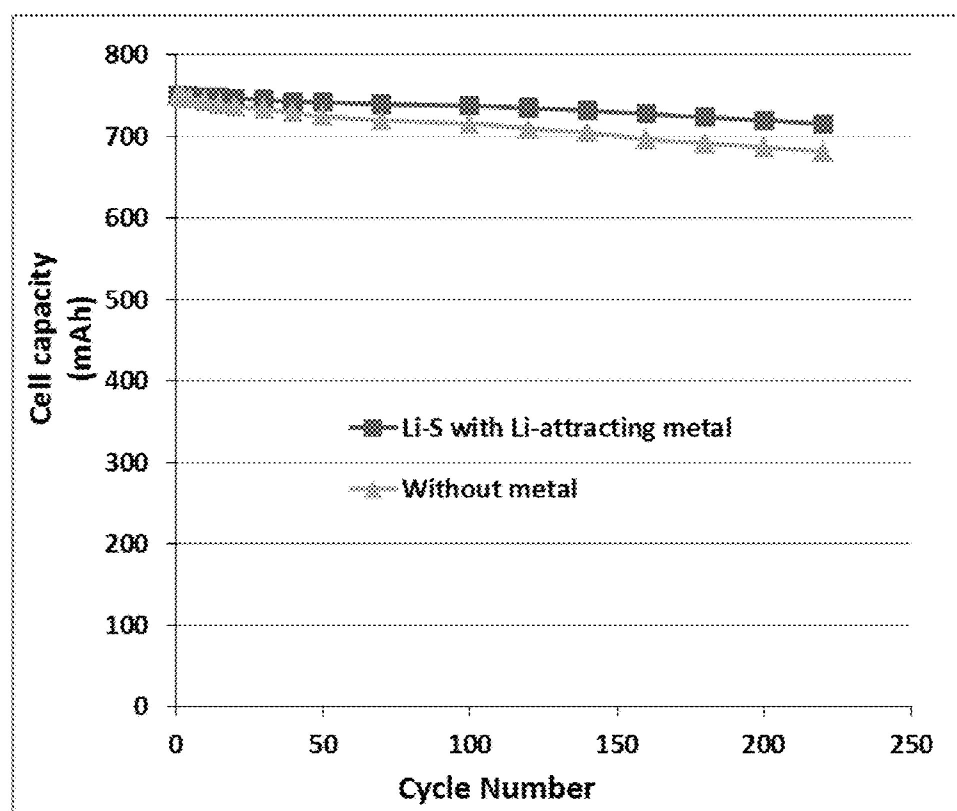
FIG. 7(B) The cycling behaviors of two sets of lithium metal cells: (a) first cell containing nitrogen-doped graphene-carbon-metal (Zn) hybrid foam, in physical contact with a lithium foil, as the anode active material; (b) the second cell containing no lithium-attracting metal (Zn).

Shown in FIG. 7(A) are Ragone plots (gravimetric power density vs. energy density) of two sets of lithium metal cells: (a) first cell containing nitrogen-doped graphene-carbon-metal (Zn) hybrid foam, in physical contact with a lithium foil, as the anode active material; (b) the second cell containing no lithium-attracting metal (Zn). These plots indicate that the energy density and power density ranges of these two cells are comparable. However, SEM examination of the cell samples, taken after 30 charge-discharge cycles, indicates that the sample containing a Li-attracting metal has essentially all the lithium ions returning from the cathode during charge being encased inside pores of the foam structure, having no tendency to form lithium dendrites. In contrast, for the cell containing no lithium-attracting metal, lithium metal tends to get re-plated on external surfaces of graphene foam in a less uniform manner. Further surprisingly, as shown in FIG. 7(B), the cell containing nitrogen-doped graphene-carbon-metal (Zn) hybrid foam exhibits a more stable cycling behavior.

Figure 8:
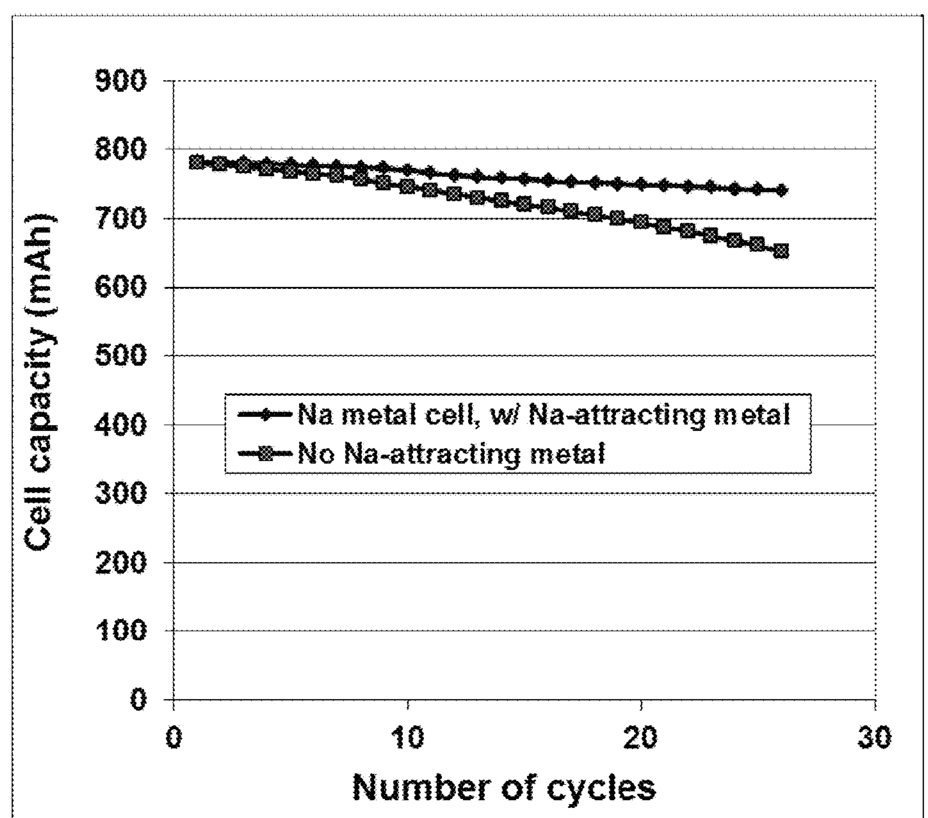
FIG. 8 The battery cell capacity decay curves of two sodium metal cells: one cell containing a pristine graphene-carbon-metal (Mg) foam and a sheet of Na foil as the anode active material and $NaFePO_4$ as the cathode active material, and the other cell containing pristine graphene-carbon foam (but no sodium-attracting metal) and a sheet of Na foil as the anode active material.

Shown in FIG. 8 are battery cell capacity decay curves of two sodium metal cells. One cell contains a pristine graphene-carbon-metal (Mg) foam and a sheet of Na foil as the anode active material, and $NaFePO_4$ as the cathode active material. For comparison, a sodium metal cell containing pristine graphene-carbon foam (but no sodium-attracting metal) and a sheet of Na foil as the anode active material is also investigated. The cell having a sodium-attracting metal residing in a graphene-carbon cell shows a significantly more stable cycling behavior.

In conclusion, we have successfully developed an absolutely new, novel, unexpected, and patently distinct class of highly conducting graphene-carbon-metal hybrid foam materials that can be used in a lithium metal battery or sodium metal battery for overcoming the dendrite issues. This class of new materials has now made it possible to use lithium metal and sodium metal batteries that have much higher energy densities as compared to the conventional lithium-ion cells.

We claim:

1. An alkali metal battery having an anode, a cathode, an electrolyte in ionic contact with said anode and said cathode, and an optional porous separator electronically separating said anode and said cathode, wherein said anode comprises an integral 3D graphene-carbon-metal hybrid foam comprised of multiple pores, pore walls, and a lithium-attracting metal or sodium-attracting metal residing in said pores or deposited on said pore walls; wherein said lithium-attracting metal is selected from the group consisting of Au, Ag, Mg, Zn, Ti, Na, K, Al, Fe, Mn, Co, Ni, Sn, V, Cr, and an alloy thereof for a lithium metal battery, or said sodium-attracting metal is selected from the group consisting of Au, Ag, Mg, Zn, Ti, Li, K, Al, Fe, Mn, Co, Ni, Sn, V, Cr, and an alloy thereof for a sodium metal battery, and is in an amount of 0.1% to 90% of the total hybrid foam weight, and said pore walls comprise single-layer or few-layer graphene sheets chemically bonded by a carbon material having a carbon material-to-graphene weight ratio from 1/200 to 1/2, wherein said few-layer graphene sheets have 2-10 layers of stacked graphene planes having an inter-plane spacing $d_{002}$ from 0.3354 nm to 0.40 nm as measured by X-ray diffraction and said single-layer or few-layer graphene sheets comprise a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof; wherein said integral 3D graphene-carbon-metal hybrid foam is pre-loaded with lithium or sodium before said battery is made, or said anode further comprises a lithium source or a sodium source.

2. The alkali metal battery of claim 1, further comprising an additional separate, discrete anode current collector in contact with said anode, and/or a separate, discrete cathode current collector in contact with said cathode.

3. The alkali metal battery of claim 1, wherein said cathode comprises an integral 3D graphene-carbon hybrid foam composed of multiple pores and pore walls, wherein said pore walls contain single-layer or few-layer graphene sheets chemically bonded by a carbon material having a carbon material-to-graphene weight ratio from 1/200 to 1/2, wherein said few-layer graphene sheets have 2-10 layers of stacked graphene planes having an inter-plane spacing $d_{002}$ from 0.3354 nm to 0.40 nm as measured by X-ray diffraction and said single-layer or few-layer graphene sheets contain a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

4. The alkali metal battery of claim 1, wherein said 3D graphene-carbon hybrid foam, when measured without said metal, has a density from 0.005 to 1.7 g/cm$^3$, a specific surface area from 50 to 3,200 m$^2$/g, a thermal conductivity of at least 200 W/mK per unit of specific gravity, and/or an electrical conductivity no less than 2,000 S/cm per unit of specific gravity.

5. The alkali metal battery of claim 1, wherein said pore walls contain a pristine graphene and said 3D graphene-carbon hybrid foam, when measured without said metal, has a density from 0.1 to 1.7 g/cm$^3$, an average pore size from 2 nm to 50 nm, and a specific surface area from 300 m$^2$/g to 3,200 m$^2$/g.

6. The alkali metal battery of claim 1, wherein said pore walls contain a non-pristine graphene material and wherein said foam contains a content of non-carbon elements in the range of 0.01% to 20% by weight and said non-carbon elements include an element selected from oxygen, fluorine, chlorine, bromine, iodine, nitrogen, hydrogen, or boron.

7. The alkali metal battery of claim 1, wherein said battery is in a continuous-length filament, wire, or sheet form having a thickness or diameter from 200 nm to 10 cm.

8. The alkali metal battery of claim 1, wherein said graphene-carbon hybrid foam, when measured without said metal, has an oxygen content or non-carbon content less than 1% by weight, and said pore walls have an inter-graphene spacing less than 0.35 nm, a thermal conductivity of at least 250 W/mK per unit of specific gravity, and/or an electrical conductivity no less than 2,500 S/cm per unit of specific gravity.

9. The alkali metal battery of claim 1, wherein said graphene-carbon hybrid foam, when measured without said metal, has an oxygen content or non-carbon content less than 0.01% by weight and said pore walls contain stacked graphene planes having an inter-graphene spacing less than 0.34 nm, a thermal conductivity of at least 300 W/mK per unit of specific gravity, and/or an electrical conductivity no less than 3,000 S/cm per unit of specific gravity.

10. The alkali metal battery of claim 1, wherein said graphene-carbon hybrid foam, when measured without said metal, has an oxygen content or non-carbon content no greater than 0.01% by weight and said pore walls contain stacked graphene planes having an inter-graphene spacing less than 0.336 nm, a thermal conductivity of at least 350 W/mK per unit of specific gravity, and/or an electrical conductivity no less than 3,500 S/cm per unit of specific gravity.

11. The alkali metal battery of claim 1, wherein said graphene-carbon hybrid foam, when measured without said metal, has pore walls containing stacked graphene planes having an inter-graphene spacing less than 0.336 nm, a thermal conductivity greater than 400 W/mK per unit of specific gravity, and/or an electrical conductivity greater than 4,000 S/cm per unit of specific gravity.

12. The alkali metal battery of claim 1, wherein the pore walls contain stacked graphene planes having an inter-graphene spacing less than 0.337 nm and a mosaic spread value less than 1.0.

13. The alkali metal battery of claim 1, wherein said pore walls contain a 3D network of interconnected graphene planes.

14. The alkali metal battery of claim 1, wherein said foam, when measured without said metal, has a physical density higher than 0.8 g/cm$^3$ and a specific surface area greater than 800 m$^2$/g.

15. The alkali metal battery of claim 1, wherein said foam, when measured without said metal, has a physical density higher than 1.0 g/cm$^3$ and a specific surface area greater than 500 m$^2$/g.

16. The alkali metal battery of claim 1, wherein said lithium source is selected from foil, particles, or filaments of lithium metal or lithium alloy having no less than 80% by weight of lithium element in said lithium alloy; or wherein said sodium source is selected from foil, particles, or filaments of sodium metal or sodium alloy having no less than 80% by weight of sodium element in said sodium alloy.

17. An alkali metal battery electrode containing an integral 3D graphene-carbon-metal hybrid foam composed of multiple pores, pore walls, and a lithium-attracting metal or sodium-attracting metal residing in said pores or deposited on said pore walls; wherein said lithium-attracting metal is selected from Au, Ag, Mg, Zn, Ti, Na, K, Al, Fe, Mn, Co, Ni, Sn, V, Cr, or an alloy thereof for a lithium metal battery, or said sodium-attracting metal is selected from Au, Ag, Mg, Zn, Ti, Li, K, Al, Fe, Mn, Co, Ni, Sn, V, Cr, or an alloy thereof for a sodium metal battery, and is in an amount of 0.1% to 90% of the total hybrid foam weight, and said pore walls contain single-layer or few-layer graphene sheets chemically bonded by a carbon material having a carbon material-to-graphene weight ratio from 1/200 to 1/2, wherein said few-layer graphene sheets have 2-10 layers of stacked graphene planes having an inter-plane spacing $d_{002}$ from 0.3354 nm to 0.40 nm as measured by X-ray diffraction and said single-layer or few-layer graphene sheets contain a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof; wherein said integral 3D graphene-carbonmetal hybrid foam is pre-loaded with lithium or sodium before said electrode is made, or said electrode further comprises a lithium source or a sodium source.

18. An alkali metal battery having a cathode, an anode comprising the electrode of claim 17, a porous separator electronically separating said anode and said cathode, and/or an electrolyte in ionic contact with said anode and said cathode, wherein a weight ratio of said pre-loaded lithium to said lithium-attracting metal or a weight ratio of said pre-loaded sodium to said sodium-attracting metal is from 1/100 to 100/1.

19. A process for producing the alkali metal battery electrode containing an integral 3D graphene-carbon-metal hybrid foam of claim 17, said process comprising:

(a) mixing multiple particles of a graphitic material and multiple particles of a solid polymer carrier material to form a mixture in an impacting chamber of an energy impacting apparatus;

(b) operating said energy impacting apparatus with a frequency and an intensity for a length of time sufficient for peeling off graphene sheets from said graphitic material and transferring said graphene sheets to surfaces of said solid polymer carrier material particles to produce graphene-coated or graphene-embedded polymer particles inside said impacting chamber;

(c) recovering said graphene-coated or graphene-embedded polymer particles from said impacting chamber;

(d) mixing said graphene-coated or graphene-embedded polymer particles with said lithium-attracting metal, or a precursor to said metal, to form a mixture;

(e) consolidating said mixture into a sheet, film, rod, or filament structure;

(f) pyrolyzing said structure to thermally convert said polymer into pores and carbon or graphite that bonds said graphene sheets to form a sheet, film, rod, or filament of said integral 3D graphene-carbon-metal hybrid foam; and (g) adding said pre-loaded lithium or sodium.

20. A process for producing the alkali metal battery electrode containing an integral 3D graphene-carbon-metal hybrid foam of claim 17, said process comprising:

(A) mixing multiple particles of a graphitic material, multiple particles of a solid polymer carrier material, and milling media particles to form a mixture in an impacting chamber of an energy impacting apparatus;

(B) operating said energy impacting apparatus with a frequency and an intensity for a length of time sufficient for said milling media particles to impact said graphitic material particles, peeling off graphene sheets from said graphitic material particles and transferring said graphene sheets to surfaces of said solid polymer carrier material particles to produce graphene-coated or graphene-embedded polymer particles inside said impacting chamber;

(C) recovering said graphene-coated or graphene-embedded polymer particles from said impacting chamber;

(D) mixing said graphene-coated or graphene-embedded polymer particles with said lithium-attracting metal, or a precursor to said metal, to form a mixture;

(E) consolidating said mixture into a sheet, film, rod, or filament structure; and (F) pyrolyzing said structure to thermally convert said polymer into pores and carbon or graphite that bonds said graphene sheets to form a sheet, film, rod, or filament of said integral 3D graphene-carbon-metal hybrid foam; and (G) adding said pre-loaded lithium or sodium.

21. The process of claim 19, wherein said step (e) of consolidating said mixture is conducted in a roll-to-roll manner to form a roll of sheet, film, or filament which is pyrolyzed to form a sheet, film, or filament of said integral 3D graphene-carbon-metal hybrid foam.

22. A process for producing an alkali metal battery, said process comprising steps of laminating an anode layer, a separator/electrolyte layer, and a cathode layer, wherein said anode layer comprises the electrode of claim 17.

23. An alkali metal battery electrode containing an integral 3D graphene-carbon-metal hybrid foam composed of multiple pores, pore walls, and a lithium-attracting metal or sodium-attracting metal residing in said pores or deposited on said pore walls; wherein said lithium-attracting metal is selected from Au, Ag, Mg, Na, K, V, Cr, or an alloy thereof for a lithium metal battery, or said sodium-attracting metal is selected from Au, Ag, Mg, Li, K, V, Cr, or an alloy thereof for a sodium metal battery, and is in an amount of 0.1% to 90% of the total hybrid foam weight, and said pore walls contain single-layer or few-layer graphene sheets chemically bonded by a carbon material having a carbon material-to-graphene weight ratio from 1/200 to 1/2, wherein said few-layer graphene sheets have 2-10 layers of stacked graphene planes having an inter-plane spacing $d_{002}$ from 0.3354 nm to 0.40 nm as measured by X-ray diffraction and said single-layer or few-layer graphene sheets contain a pristine graphene material having essentially zero % of non-carbon elements, or a non-pristine graphene material having 0.001% to 25% by weight of non-carbon elements wherein said non-pristine graphene is selected from the group consisting of graphene oxide, reduced graphene oxide, graphene fluoride, graphene chloride, graphene bromide, graphene iodide, hydrogenated graphene, nitrogenated graphene, doped graphene, chemically functionalized graphene, and combination thereof.

* * * * *